United States Patent
Roy et al.

(10) Patent No.: US 12,554,725 B2
(45) Date of Patent: Feb. 17, 2026

(54) SYSTEM AND METHOD FOR SEARCHING ELECTRONIC RECORDS USING GESTURES

(71) Applicant: Global Relay Communications Inc., Vancouver (CA)

(72) Inventors: Warren Roy, London (GB); Danielly Pierobon Roper, Vancouver (CA); Dimitrios Kontaris, London (GB); Alfred Scholldorf, Kings Park, NY (US)

(73) Assignee: Global Relay Communications Inc., Vancouver (CA)

( * ) Notice: Subject to any disclaimer, the term of this patent is extended or adjusted under 35 U.S.C. 154(b) by 0 days.

(21) Appl. No.: 17/977,886

(22) Filed: Oct. 31, 2022

(65) Prior Publication Data

US 2024/0143598 A1    May 2, 2024

(51) Int. Cl.
*G06F 16/2457* (2019.01)
*G06F 16/248* (2019.01)

(52) U.S. Cl.
CPC .. *G06F 16/24575* (2019.01); *G06F 16/24578* (2019.01); *G06F 16/248* (2019.01)

(58) Field of Classification Search
CPC ............ G06F 16/245; G06F 16/24575; G06F 16/24578; G06F 16/2455; G06F 16/248; G06F 3/017; G06F 3/0482; G06F 3/04842; G06F 3/0488
See application file for complete search history.

(56) References Cited

U.S. PATENT DOCUMENTS

| | | | | |
|---|---|---|---|---|
| 10,809,890 | B1* | 10/2020 | Krawczyk | G06F 16/438 |
| 2014/0055426 | A1* | 2/2014 | Park | G06F 3/03545 |
| | | | | 345/179 |
| 2015/0054748 | A1* | 2/2015 | Mason | G06F 3/017 |
| | | | | 345/168 |
| 2015/0268752 | A1* | 9/2015 | Ku | G06F 1/3206 |
| | | | | 345/173 |
| 2019/0155958 | A1* | 5/2019 | Lal | G06F 16/953 |
| 2021/0306812 | A1* | 9/2021 | Gross | G06F 3/04883 |

* cited by examiner

*Primary Examiner* — Robert W Beausoliel, Jr.
*Assistant Examiner* — Cheryl M Shechtman

(57) ABSTRACT

The disclosure presents a method, application, client and server that process search commands for a database. The method executes instructions on processors at a client and at a server the server controlling a database. First, instructions at the client determine first commands associated with a first gestures for a record; receive a gesture imparted on a touchscreen at the client; compare the gesture against the first gestures; and if the gesture matches one the first gestures, send a command mapped to the gesture to the server to be initiated to the database. Then, instruction at the server: receive the command; identify an identifier for the record; execute a query for the command and identifier; retrieve results; and send the results to the client. Then, instructions at the first processor: receive the results; display a list of the results; and determine second commands associated with second gestures.

18 Claims, 18 Drawing Sheets

200

Figure 5 https://developer.apple.com/design/human-interface-guidelines/guidelines/overview/

Standard gestures

| | Gesture | iOS | iPadOS | watchOS | Standard action | |
|---|---|---|---|---|---|---|
| [502] | Tap | ● | ● | ● | Activate a control. Select an item. | ⎫ |
| [504] | Swipe | ● | ● | ● | Reveal actions and controls. Dismiss views. Scroll. | ⎬ Enhanced Usage with Gesture-Search |
| | Pan (UIKit) / Drag (SwiftUI) | ● | ● | ● | Move a UI element. | |
| | Pinch (UIKit) / Magnification (SwiftUI) | ● | ● | -- | Zoom a view. Magnify content. | |
| [506] | Long press | ● | ● | ● | Reveal additional controls or functionality. | ⎭ |
| | Rotation | ● | ● | -- | Rotate a selected item. | |
| | Edge swipe | ● | ● | ● | Navigate. Reveal controls, information, or system experiences. | |
| | Double tap | ● | ● | -- | Zoom in. Zoom out if already zoomed in. | |
| | Three-finger swipe | ● | ● | -- | Initiate undo (left swipe). Initiate redo (right swipe). | |
| | Four-finger swipe | -- | ● | -- | Switch between apps. | |
| | Three-finger pinch | ● | ● | -- | Copy selected text (pinch in). Paste copied text (pinch out). | |

One tap on a search suggestion button immediately refines the search filter in the manner suggested by the button and presents a new set of results For advanced searching, long press on a hotspot or contextual item such as a date, name, distribution list, or category provides access to an advanced search control. For example a calendar to change date range, or a directory listing of names and groups. The actions presented then allow the user to retrieve results that match the revised search criteria.

SYSTEM AND METHOD FOR SEARCHING ELECTRONIC RECORDS USING GESTURES

FIELD OF THE DISCLOSURE

The present disclosure relates to the field methods of searching electronic records in electronic record systems. In particular, the disclosure relates to systems and methods for searching electronic messages and other items processed by a messaging system using gesture-based inputs.

DESCRIPTION OF THE BACKGROUND

As an example, prior art search engines, such as those in electronic message systems, have access to stored messages where users can access the messages and provide instructions via keyboard interfaces, such as search instructions to process and search messages. These keyboard interfaces typically involve a user providing typed commands through a keyboard (either through a physical keyboard or a keypad generated on a device). Such commands include simple keyword searches to more advanced search controls where the user can specify many different options for filtering, sorting, and otherwise manipulating the parameters of the search engine.

Such keyboard/keypad interfaces have inherent limitations of the input device, namely the physical, shape, tactile feedback, and responsiveness of the keyboard and the virtual keypad. Virtual keypads also occupy valuable space on the display which may be used for other items, such as the subject messages, this capability is handicapped by their small size and limited keyboards. Virtual keyboards generally lack a size and tactile feedback to fully provide a satisfying touch-typing interaction.

There is a need to address deficiencies in the prior art.

SUMMARY OF THE DISCLOSURE

In a first aspect, a method for processing search commands for a database of records is provided. The method comprises executing instructions on processors at a client and at a server communicating with the client, the server controlling a database. A first set of instructions is executed on a first processor at the client that: determines a first set of commands that are associated with a first set of gestures for a record extracted from the database being reviewed at the client; receives a gesture imparted on a touchscreen at the client; compares the gesture against the first set of gestures; and if the gesture matches one gesture of the first set of gestures, sends a command mapped to the gesture to the server to be initiated to the database. A second set of instructions is executed at a second processor at the server that: receives the command; identifies an identifier for the record; executes a query to the database related to the command and the identifier; retrieves results from the query from the database, the results comprising a second record having data and metadata; and sends the results to the client. A third set of instructions is executed on the first processor that: receives the results; displays a ranked list of the results; and determines a second set of commands that are associated with a second set of gestures based on the results. Generation of the results comprises accessing metadata associated with the record.

For the method, the third set of instructions may further comprise: displaying on the touchscreen a graphical hotspot for search results designated to accept additional gestures, the hotspot graphically marked by a change in one or more of visual aspects for presentation of the record in the hotspot. Further, in the method, in the hotspot an appearance of text may be distinctive from the appearance of text for the record. Further, the record may be an email; and in the hotspot the additional gestures may be associated with identifying additional records based on either a sender or a recipient of in the record.

In the method, the client may be a search application; the record may be an email; and the server may operate a search engine relating to emails.

In the method, the records may have a plurality of datatypes comprising emails, text messages, and telephone calls. Also each record may have a plurality of identifiers indicating participants of the record (where a participant is an addressee in the record). Each participant may further comprise a plurality of aliases identifying a plurality of datatypes related to the participant. If the record's participants can be identified, the command may utilize additional metadata associated with the record to identify the second record.

In the method, the results may be listed in a ranked list generated from a statistical analysis of the results.

In the method, a command "more records" may be associated with a "swipe left" gesture in the first and second sets of commands.

In a second aspect, a software application operating on a client device in communication with server having a database of records is provided. The application comprises instructions for execution on a processor at the client that: determine a first set of commands that are associated with a first set of gestures for a record extracted from the database being reviewed at the client; receive a gesture imparted on a touchscreen at the client; compare the gesture against the first set of gestures; if the gesture matches one gesture of the first set of gestures, send a command mapped to the gesture to the server to be initiated to the database; and after receiving from the server results of the command comprising a second record having data and metadata, the instructions further comprise receiving the results, displaying a ranked list of the results, and determining a second set of commands that are associated with a second set of gestures based on the results. Generation of the results comprises accessing metadata associated with the record.

The application may further comprise instructions for execution on that display on the touchscreen a graphical hotspot for search results designated to accept additional gestures, the hotspot graphically marked by a change in one or more of visual aspects for presentation of the record in the hotspot, where an appearance of text is distinctive from the appearance of text for the record. Further, the record may be an email; and in the hotspot the additional gestures may be associated with identifying additional records based on either a sender or a recipient of in the record. Further, the records may have a plurality of datatypes comprising emails, text messages, and telephone calls; the plurality of datatypes may have been aliased to an aliased datataype; the second record may further comprise an aliased datatype relating to the record; and if the identifier is not an email-type identifier, the command utilizes additional non-email metadata associated with the record to identify the second record.

In the application a command "more records" may be associated with a "swipe left" gesture in the first and second sets of commands.

A server and/or a device may be provided to implement any aspects of the methods described.

In other aspects various combinations of sets and subsets of the above aspects are provided.

BRIEF DESCRIPTION OF THE DRAWINGS

Embodiments of the disclosure will now be described, by way of example only, with reference to the accompanying drawings, in which:

FIG. 5 is a block diagram listing gestures recognized by a remote device for an embodiment of FIG. 1;

DETAILED DESCRIPTION OF EMBODIMENTS

Figure 1:
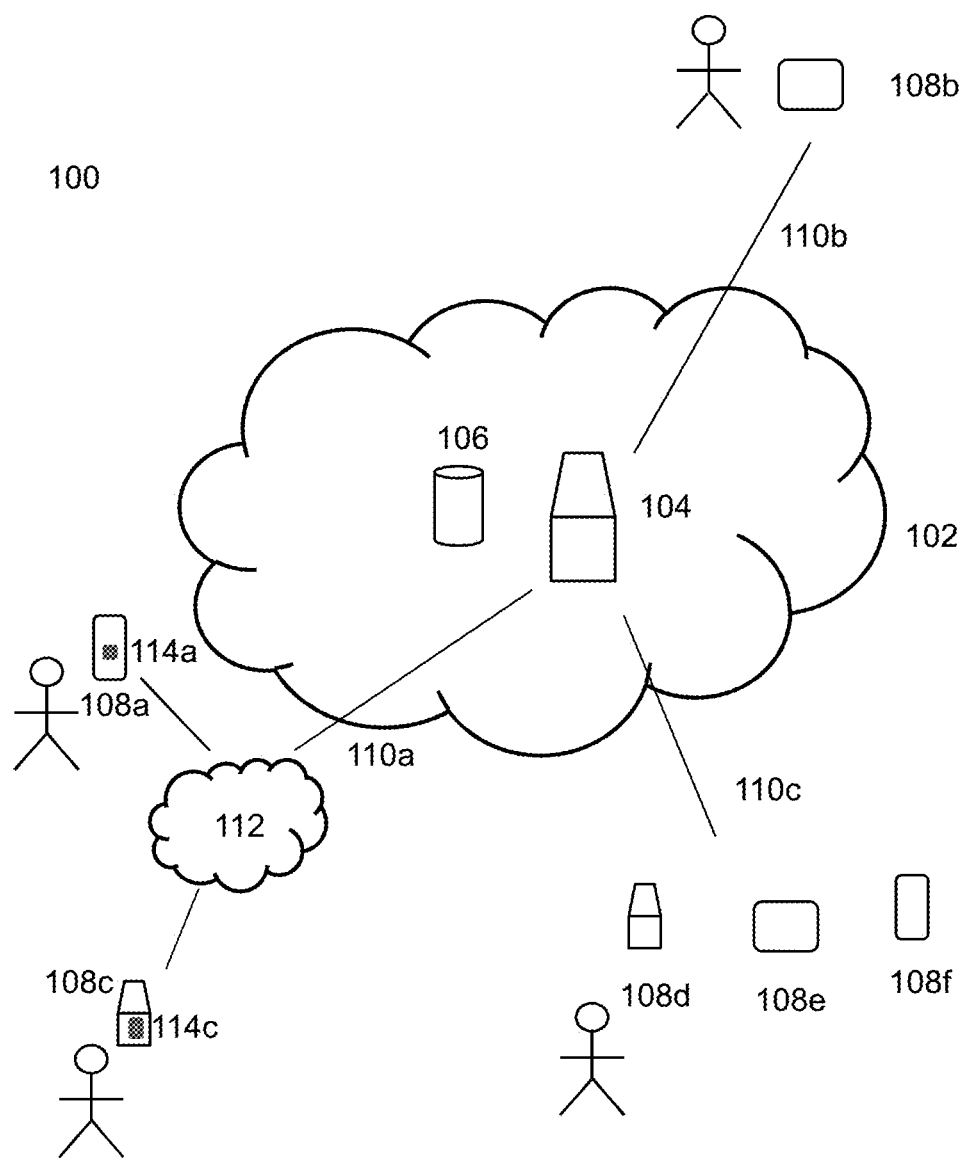
FIG. 1 is a schematic block diagram of an electronic message processing network having an electronic message platform (as a server) with a search engine and remote devices (as clients) having applications installed thereon providing access to the platform and engine according to an embodiment.

Exemplary details of embodiments are provided herein. The description which follows and embodiments described therein are provided by way of illustration of an example or examples of particular embodiments of principles of the present disclosure. These examples are provided for the purposes of explanation and not limitation of those principles and of the disclosure. In the description which follows, like parts are marked throughout the specification and the drawings with the same respective reference numerals.

Briefly, an embodiment provides an interface and processes for searching an electronic database using gestures. Typically, the database is stored on one computing device. The computing device typically will have database management software which accesses the database, present queries, and generates results from the queries. The database may be accessed by one or more computers or devices communicating with the database through a network. These remote devices have local client software installed thereon which provides an interface between these devices and the database to initiate and process local queries. The client software receives inputs and queries from users of these devices, which are then provided to the database for processing and response.

In a particular embodiment, a database stores messages (such as emails) and the database management software is a message server. Queries are managed by the software through a search engine. The remote devices have client message software installed thereon that permit users to use the search engine to query aspects of stored messages in the database. Results are generated on various screens of the displays of the client devices. The client software includes interfaces to allow a user to create inputs for the client with gestures imparted on the device. An embodiment provides an interface to the search engine where for a given search query, multiple gestures are recognized to impart a flow of related commands to the search engine. When a gesture search command is imparted, the results are retrieved and based on the results, a seed results may be identified. From the seed result, further search queries query to the database may be conducted, with further screens generated. These further screens have additional commands being accepted through additional gestures. As well, for a given gestures/command, when results are retrieved, additional context for the returned results may be provided (again as a seed results). In various embodiments described herein, the gestures are used as input signals to provide enhanced manipulation of results and expected-next commands for such search engines. The search engines may be applied to various datasets and databases, such as datasets relating to messaging systems, archiving system, e-discovery platforms, and others.

An embodiment simplifies a human computer interaction cost relating to providing an alternative input interface to a typical keyboard stroke/mouse click interface for search engines. As an example, current search engines implement a search keyword input function, by typing of several characters of text comprising a keyword or a name, and the pressing of the "Search" or "Enter" button. An embodiment provides a gesture-based search interface that implements a comparable function with a shorter series of gestures.

Exemplary benefits of a gesture-based interface are its inherent ease of use and initial understanding by the user. It also provides discoverability, which is related to an intuitiveness and ease with which the user can discover how the interface operates.

Turning now to features of an embodiment, FIG. 1 shows structural components of an embodiment and its features. An embodiment of the disclosed system and method is depicted in environment 100, where communication network 102 has platform 104 (as a message processing server) with database 106 that communicate with devices 108 through various communication links 110. Each device 108, may have installed thereon local client 114 (as software), providing an application, a related application program interface (API), and a communication interface to platform 104 through network 102. Devices 108 include wireless mobile devices 108a,f, computing tablets 108b,e and computers/laptops 108c,d. Communication links 110 may be wireless or wired. A user of exemplary device 108 has one or more message accounts managed by platform 104. Sets of message accounts may be associated with specific entities or organizations 112 (e.g. individual companies). A user account may have associations with multiple organizations 112. Messages processed by platform 104 are electronic messages. Various formats and transmission protocols may be used for communicating the messages, such as forms akin to email messages, text messages, voice mail messages, social network messages, custom datatypes, and other datatypes as known in the art.

Figure 2:
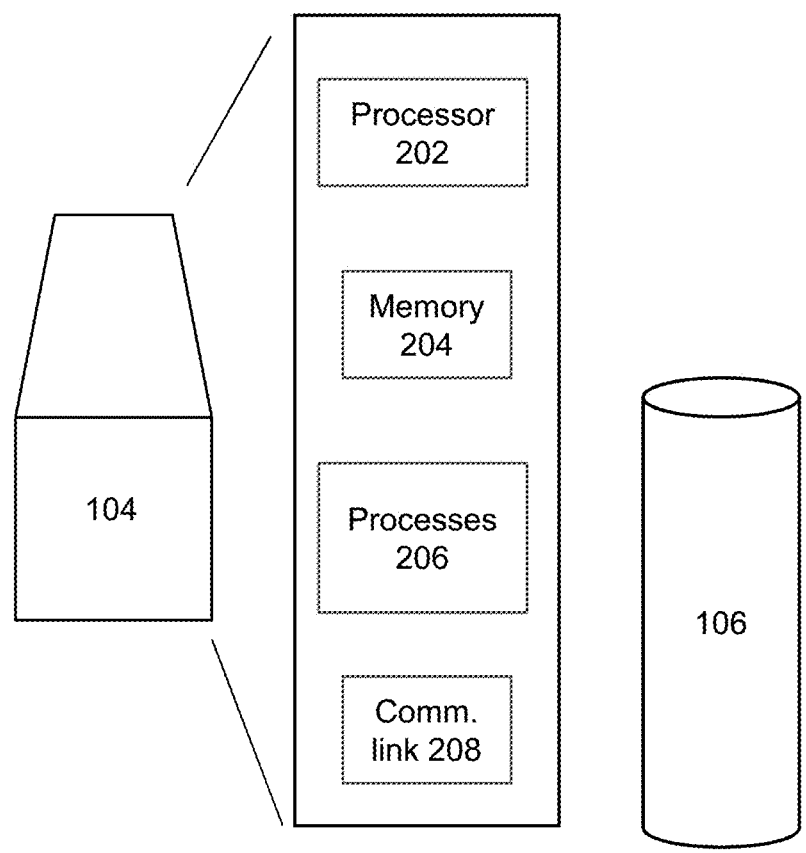
FIG. 2 is a schematic block diagram of the message platform and search engine of FIG. 1 and a database of the messaging processing network for an embodiment.

FIG. 2 shows components of platform 104, which may be implemented as a server having a typical processor and as such may be a stand-alone computer, a laptop, a tablet, a server or other computing devices. Platform 104 may be accessed directly at its terminal or remotely through a communication network. Platform 104 has processor 202, memory 204, access to database 106, and communication link module 208. Software/processes 206 operating on platform 104 through processor 202 provides instructions to access database 106, accept data, process data for storage into database 106, accept external inputs from devices 108 and other sources, generate database results based on same and generate reports and results as described above. For an embodiment, messaging process 206a is provided, which provides an electronic message system for devices 108. Typically, messaging process 206a provides email communications to devices 108. Database 106 stores records accessed by platform 104 and may be contained within system 102 or may be accessed remotely. Database 106 stores records and data relating associations for accounts, such as records relating to electronic messages (emails), text messages, recorded video, recorded audio, web pages, text, related data and other data as described herein. One or more functions of platform 104 may be distributed among several devices. It will be appreciated that devices 108 and clients 114 may have similar corresponding components and structures to comparable components shown for platform 104. In this disclosure, typical nomenclature for elements in databases known by persons of skill in the art is used. For example, a data record in the database (representing an email), may be referred to herein as a record, data record, item, search result, element, data element, etc.

For an embodiment, message process 206a comprises several sub-processes as modules, including: search engine 206b, gesture analysis module 206c, alias processing module 206d, and others. Further details of each module will be provided in turn throughout the description. While for particular examples of an embodiment provided herein relate to a message process 206a, it will be appreciated that functions and processes to handle messages by message process 206a may be provided in other embodiments, such as in an archiving system (where a comparable archive process is provided to message process 206a).

Figure 3:
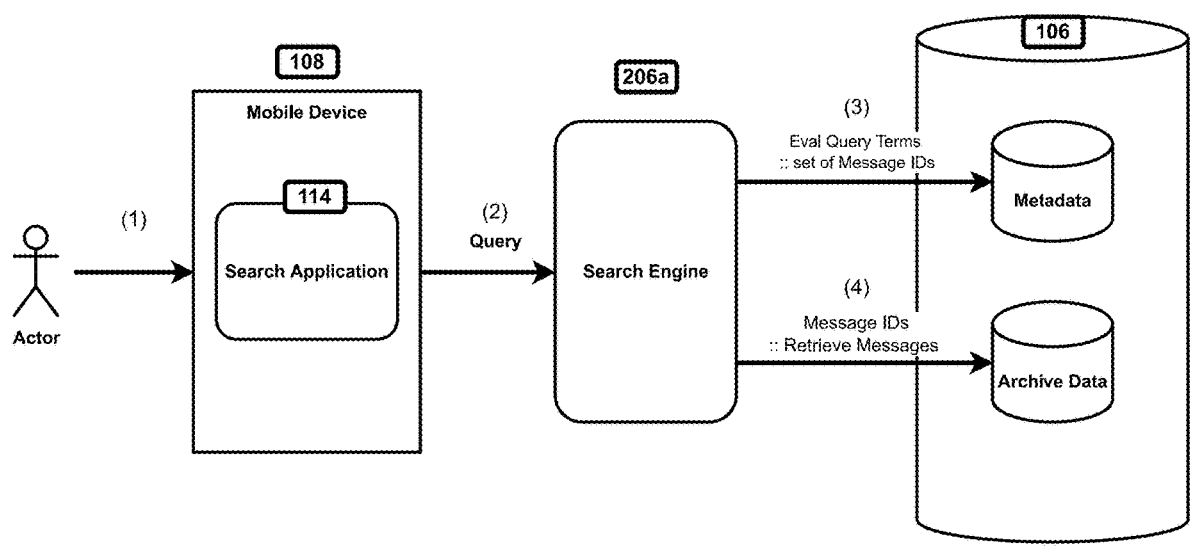
FIG. 3 is a schematic block diagram of a user of a remote device communication with the search engine of the electronic message system for an embodiment of FIG. 1.

FIG. 3 shows an interaction of exemplary device 108 by its user with the messaging system, where the user's account is accessing database 106. Device 108 has a touch screen with message processing client 114 installed thereon. Search engine 206b is installed on platform 104, which responds to queries presented to it from devices 108. Search engine 206b accesses data in database 106, which includes archived data and metadata. As part of an embodiment, user of device 108 imparts gestures on its touchscreen as input commands to its message processing client 114. Client 114 is adapted to process gestures, determine whether an imparted gesture is a command for a particular screen generated by client 114 and if so, provide that command to search engine 206b. Search engine 206b then processes that command, accesses database 106 as needed, retrieves contextual information related to that command, and provides results to client 114 for generation on the display of device 108.

Figure 4:
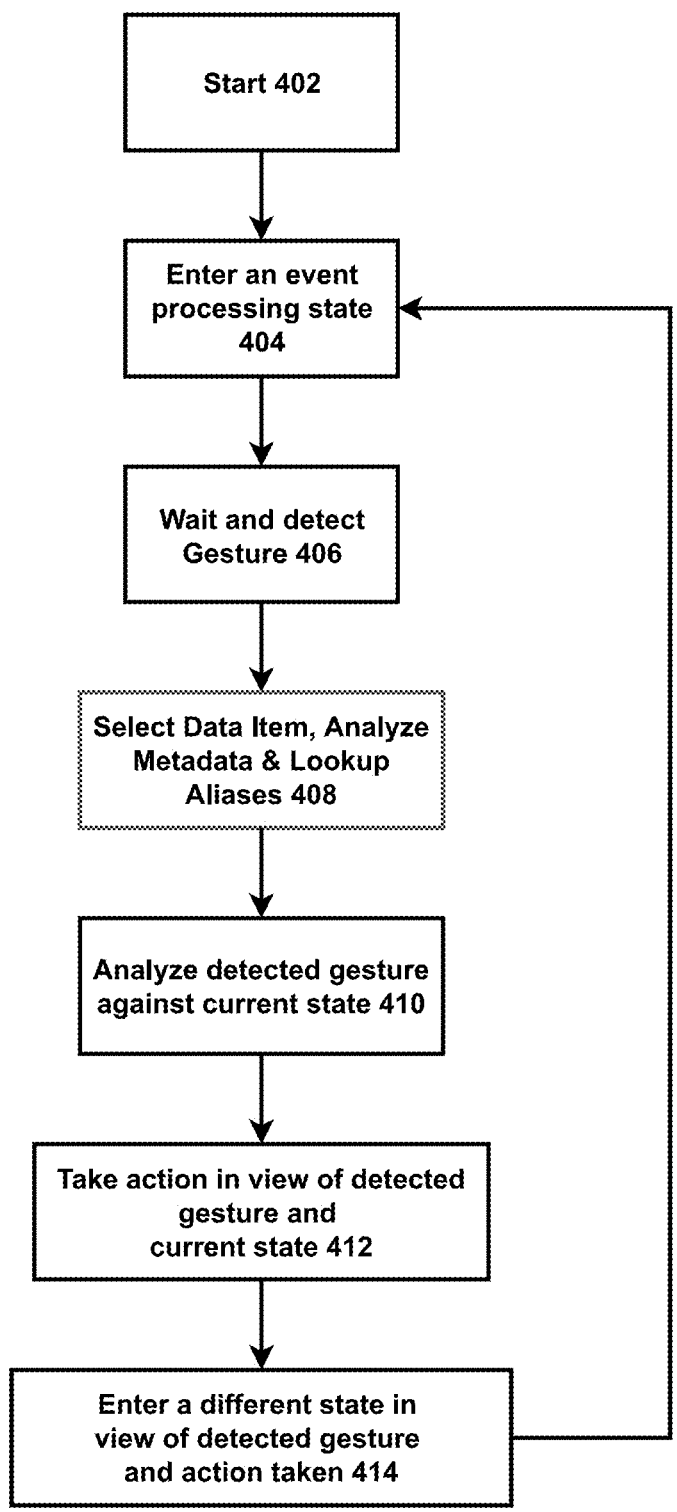
FIG. 4 is a block diagram of macro processes of a search algorithm using gestures as implemented by the search engine for an embodiment of FIG. 1.

Referring to FIG. 4, algorithm 400 illustrates a general set of actions executed collectively by message processing client 114 and (message) process 206a, with its search engine 206b and gesture analysis module 206c. Start process 402 is the initiation process for both client 114 and process 206a, which may include procedures to instantiate variables, set parameters, set communication links, and configure other ancillary items. From start 400, the main loop is entered, where at event processing state 404, predefined actions are initiated (which may include configuration actions noted above). Once these are completed at process 406, the algorithm is waiting for an input (which may be a gesture entered at device 108). At device 108, once a gesture is detected, at process 408 it is analyzed to determine what the gesture represents (e.g. it is an up swipe, a left swipe, a double tap, etc.). Such analysis may include analyzing metadata and conducting additional searches utilizing aliases. It can be appreciated that the selected data item implicitly indicates that the user is interested in this specific item from the list of items returned. As such, the additional metadata and alias information associated with that item can reveal additional related items that assist with identifying more selective search criteria and results than if a standard search was applied. With an embodiment, the metadata and an alias mapping enable adding selective criteria to the candidate set of search criteria. For example if the selected data item was of datatype email a criteria of "datatype=mail" may be added to the candidate set of criteria. Next the metadata of the selected data item is analyzed to determine additional facts such as direction of the data item (sent to or received from), whether the sender or recipients are in the same organization as user, whether the sender or recipients are in the favorites list of the user, the priority flag(s) of the data item, and other factors. Finally algorithm 400 looks up the sender and recipient(s) aliases in one or more directories of aliases. Aliases and/or domain portions of addresses provide additional candidate search criteria that can be added to the set of search suggestions to be ranked and presented to the user as options for selection of the next state.

This analysis would typically be handled by client 114, but it may be conducted on process 206a. After the gesture is analyzed, then at process 410 an action is executed representing the "command" deemed to be provided from the gesture for that process (e.g. if a left swipe is detected, then the process updates the display. Part of that action may involve accessing data and meta data for a related object. After completion of that action, the event processing is completed, so at process 412, a different state is entered and the algorithm loops back to state 404 to process that different state.

It will be appreciated that various tasks, commands, and processes provided by an embodiment may be managed exclusively by either client 114 or process 206a or through allocating specific tasks between the two entities, with appropriate messaging and signalling being provided between the two entities. For example, an embodiment may implement a logical allocation of such tasks between client 114 and process 206a, depending on various factors, such as location of relevant data, communications needed between the devices, relative processing capacities of the devices, and others. For one implementation, client 114 provides processes to receive and analyze the gestures imparted on device 108 and requests relevant metadata from obtained from the server. It will be appreciated that in one configuration, process 206a has processes that respond to gesture commands received and processed by client 114. Client 114 may track and log gesture commands received, sequences of commands, and actions performed by the user, including the gesture or keystroke that was used.

Client 114 has processes to analyze data and metadata received from process 206a. Client 114 may cache the data and metadata to reduce the number of server requests.

Now further details are provided on an embodiment as applied to using gestures to process electronic messages. Typically, data in database 106 (FIG. 1) includes a set of data and documents for electronic messages, generally stated as email messages. For universality, many email messages are encoded in standardized formats (such as an EML or MSG format). As well, the structure, form, and content of email messages typically follow one or more recognized standards, including Request for Comments (RFC) standards set by various industry and technical bodies. Some relevant RFCs to email messages include:

| RFC | Description |
|---|---|
| RFC 5322 | Internet Message Format (basic format of an email message), previously RFC 822 and RFC 2822. |
| RFC 2045 | Multipurpose Internet Mail Extensions (MIME) Part One: Format of Internet Message Bodies. This is an extension to the email message format to support attachments and non-ASCII data in emails. |
| RFC 2046 | Multipurpose Internet Mail Extensions (MIME) Part Two: Media Types. |
| RFC 2047 | MIME (Multipurpose Internet Mail Extensions) Part Three: Message Header Extensions for Non-ASCII Text. |
| RFC 2231 | MIME Parameter Value and Encoded Word Extensions: Character Sets, Languages, and Continuations. |

With these standardized formats and contents, an email datatype will typically have at least the following parts:

| Message part | Notes |
|---|---|
| Message Envelope | While technically not a part of a message, the Envelope provides data needed to transmit and deliver the message, or information added by a journaling process as the message is processed for archiving. |
| Message Header | The Header typically includes a series of header lines. Each header line typically provides of a field name, followed by a colon (:), followed by a field body, and terminated by a carriage return/line feed (CR/LF). |
| Message Body | The Body typically includes of series of lines of text, each collection commonly called a Multipurpose Internet Mail Extension (MIME) part. MIME parts may be encoded in various formats to preserve the content of each element. |

An email message may also include with metadata. Metadata is commonly defined as data about data. For an embodiment metadata may be provided in one or more of the following categories relating to the specific email: indexes, summaries, lookups, aggregations, and types. It will be seen that contents of the parts of an email may be characterized as data and/or metadata, depending on how the contents are being used. For an embodiment, generally metadata for a record may be contents of any field or subfield of the record. For example, metadata for an email or voicemail may be data in its body, header or envelope or other data or fields (e.g. data or fields for tags, time, location, cookies, watermarks, etc.).

Indexes are typically used to improve performance of email messaging system. An index for an email permits a focused scan through indices of all email messages by the messaging system. Having an index allows a search engine for a messaging system to narrow a scope of a search for relevant data under consideration. For example, a messaging process may organize email messages by time and maintain a subset of its indices in time order. Users may then more quickly access and search recent email messages (as tracked in the indices).

Summaries are typically used to extract more-relevant portions of a message for indexing, leaving the less-relevant portions unindexed. For example, HTML, PDF, and rich-formatted messages can be stripped of their formatting leaving only the plain text.

Lookups are typically used to identify common identifier (s) in messages (for example, email addresses, phone numbers, organizational units, distribution lists, and group names). Some organizations provide regularly synchronized collections of their organizational data such as Lightweight Directory Access Protocol (LDAP) directories and Active Directory (trademark, Microsoft Corporation) access containing their organizational units, users, distribution lists and contact lists, groups, shared mailboxes, etc.

Metadata may be added to email messages by the messaging system or may be extracted from the flow of data into the archive. Metadata may be actively added when the messaging system conducts a directory synchronization of daily uploads of information about the related organization's structure, users, email addresses for those users, groups and group memberships, phone numbers, and other attributes of the users. As well, metadata may be acquired implicitly by scanning the items being processed "on the fly" (e.g. when messages are processed and delivered for archiving) and extracting values from headers of email messages.

As well, other "non-email" datatypes (e.g. photographs, graphics, videos, text messages, social media postings, maps, voice recordings, etc.) may be represented in email datatype format by using optional headers, additional (message) body parts, and structuring of the non-email data using email standards or other mapping techniques to convert a "non-email" datatype to mimic an "email-like" data representation, for example to represent identifiers of participants as an alias.

Figure 18:
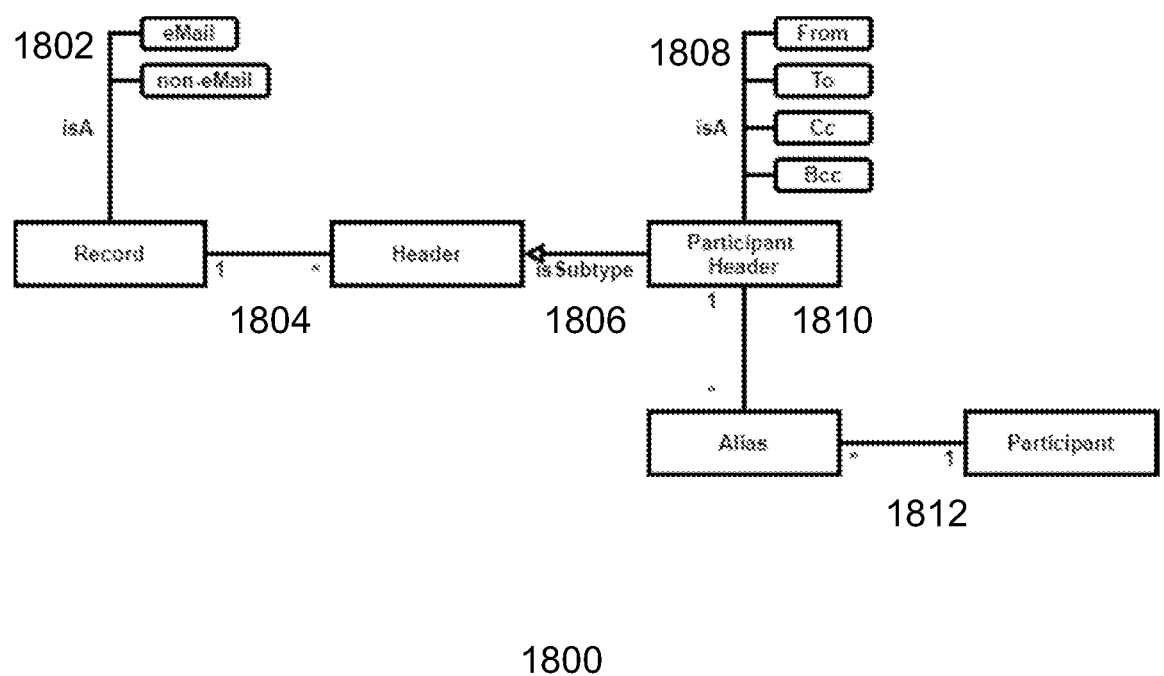
FIG. 18 is a block data diagram of a data structure of an alias structure for records having multiple identifiers accessed by the search engine for an embodiment of FIG. 1.

Referring to FIG. 18, for an alias, multiple records having multiple types of identifiers (e.g. emails with addressees, telephone calls with telephone number) may have a common element (e.g. the sender of an email has the noted telephone number). Identifiers for records provide an alias for searches. Records for different datatypes may have associated headers, identifiers, and alias mappings to facilitate identifying common participants among the different datatypes. In FIG. 18, mapping 1800 shows an exemplary data mapping model illustrating aliases among records of potentially different datatypes. In mapping 1800, the following data relationships are shown:

a Record is a ("isA") eMail or is a non-eMail per relationships 1802;

a Record has many Headers (1:* relationship), per relationship 1804;

a Participant Header is a SubType ("isSubtype") of Header per relationship 1806;

a Participant Header isA (typeof): From, To, Cc, or Bcc, per relationships 1808;

a Participant Header has many aliases (1:* relationship), per relationship 1810; and a Participant has many aliases (1:* relationship), per relationship 1812.

Here, it will be seen that an alias may be derived from a Participant Header, which identifies a Participant of a record, which identifies the set of (many) aliases that may appear in Participant Headers of other records.

When the non-email data is packaged into such an email-like data presentation, it may be processed, stored, transmitted and used like an email message. When the converted data is exported, or displayed the "email-like" representation may be retrieved and converted back to a suitable form. It will be appreciated that the email format provides a commonly used and flexible data format which is useful as a base format for converting from and to other datatypes, for indexing, and for searching. Other formats, such as JSON, XML, or MAPI message formats, may be used with appropriate data import and export facilities being provided with appropriate data/format converter modules for the relevant datatypes.

Now, further details of an embodiment are provided in the context of a user accessing a messaging system on his device, where an application ("app") is installed and provides program instructions thereon to receive and process gesture-based commands for a user to navigate through a search application (such as for an email application). One particular feature provides enhanced commands and user interfaces for managing email lists, contacts, actions, and archived data in the application.

A feature of gesture-based input reduces a user's effort in exploring the vast space of Archive Data. Over time and due to the efforts of vendors such as Apple and Google to standardize the use of hand gestures on touchscreens, and due to the prevalence of apps for mobile devices that use gesture-based input, users have become accustomed to gesture-based input.

As part of utilizing gestures as input signals for devices for an embodiment, it is useful to have a standardized set of actions representing predefined gestures. Device manufacturers and industry bodies have been developing such standards. FIG. 5 shows a chart of exemplary touchscreen gestures that are recognized on iPhones and iPads (from Apple Corporation) using the iOS operating system. Row 502 provides a definition of a "tap" gesture and its typically expected action. Similarly rows 504 and 506 show definitions for "swipe" and "long press" gestures. Other defined gestures include "pan", "pinches", "rotation", "edge swipes", "double taps", and multiple finger swipes and pinches. Similarly, Android-based devices have also defined comparable gesture definitions and recommendations for its mobile operating system. It will be seen that gestures as input signals to devices provide enhanced signals that can build in additional semantics and flexibilities over simple keystroke entries or hard-coded button in user interfaces on devices. Gesture recognition modules provide rich semantics and flexibilities in providing more, different, and enhanced choices and options in navigating through a user interface. Using standardized gestures (such as those provided in iPhones and Android devices) provide an intuitive set of potential input command signals for an embodiment.

For an embodiment, its application utilizes as inputs standardized touchscreen gestures for its user interface, such as those defined for iPhones and Android devices. However, an embodiment provides an enhanced user interface by providing context-sensitive, next-action interfaces (such as popup menus, slide-outs, overlays and other controls) based on a detected gesture and a target or object related to that gesture. These next-action interfaces and relationships provide a user interface that permits a user to implement detailed, multi-stepped actions without necessarily utilizing additional keyboard input.

For an embodiment, gestures as input signals to a user interface for a search engine are provided. Certain search processing commands and options utilizing gestures are described herein.

Table 1 presents a summary of actions which may be triggered using a gesture-based interface for an embodiment. It will be appreciated that these action/gesture pairings are not exhaustive and can be modified for different purposes as needed.

TABLE 1

Actions Triggered by Gestures

| 1st Gesture | 2nd Gesture | Target Object of Gesture | Action |
|---|---|---|---|
| Tap | n/a | First Selected Item | Display item in full screen mode and enable swipe left or right to move the displayed item to the previous or next item of the result set. |
| Swipe Left | n/a | First Selected Item | Overlay the "Swipe Menu" of buttons on top of the First Selected Item. Typically there are three buttons depending on the First Selected Item: A "more" button and 2 other buttons. |
| | Tap Button 1 | First Selected Item | The "More" button is activated. Overlay entire screen with the "Item Preview" and an expanded list of Search Suggestion Buttons. |
| | Tap Button 2 | First Selected Item | Apply search filter as indicated on button label. |
| | Tap Button 3 | First Selected Item | Apply search filter as indicated on button label. |
| Swipe Left | Long Swipe Left | First Selected Item | Same as Tap Button 1 action. |
| Long Press | n/a | First Selected Item | Overlay entire screen with the "Item Preview" and an expanded list of Search Suggestion Buttons. |
| Swipe Left | n/a | Item Full Display | Navigate to next item in Full Item Display mode. |
| Swipe Right | n/a | Item Full Display | Navigate to previous item in Full Item Display mode. |

TABLE 1-continued

Actions Triggered by Gestures

| 1st Gesture | 2nd Gesture | Target Object of Gesture | Action |
| --- | --- | --- | --- |
| Swipe Up | n/a | Item Full Display | Overlay item with list of Search Suggestion Buttons. |
| Tap | n/a | Item Preview Display | Advanced Search. Replace the "Item Preview" with the First Selected Item in full screen mode and with hotspots enabled. |
| Tap | n/a | Search Suggestion Button N | Apply search filter as indicated on button label. |
| Tap | n/a | URL or Hotspot on Advanced Search Display | Activate the corresponding advanced search control which overlays a portion of the current display. |

Now, features of an embodiment are described for search interfaces, notably searches for archived/stored messages. It can be appreciated that searches over a very general space, for example websites accessible to Google search, face difficulties with a large dataset of websites. However, an embodiment provides searches in context-restricted domains, where additional data in the searched data set (such as metadata), facilitates domain-specific searches utilizing gestures as input signals to the related user interface.

For an embodiment, a domain-specific search algorithm benefits from a data set having a common format, such as email messages. Further domain-specificity is provided as when the dataset is searching messages typically related in some way to the account user, for example, sent by the user (the user is the sender on the From: header), received as direct recipient (on the To: header), copied as an indirect recipient (on the CC: header), or blind copied (on the BCC: header). Context specific metadata of the data being searched facilitates generation of domain-specific button labels, suggested search refinements, and gesture-initiated workflows in the user interface that guides the user in making reviewing search results and initiating improved "next action" commands from the results shown.

Other metadata is also available about the user and the organization of the user performing the search such as the organizational units, users, distribution lists and contact lists, "favorite" or "followed" contacts, group memberships, shared mailboxes of the user, etc. This so-called "personalization metadata" affords the embodiment and the search engine clues about the context of the user. Personalization metadata is used by the application to customize search filter options and advanced search controls.

As part of an embodiment, for the messaging system, for its database, in addition to storing typical (email) messages for a user's account, additional, non-email material and datatypes are also stored and associated with the user's account. Such non-email material include, but are not limited to: instant messages and conversation histories; messages and interactions between the user's email account and non-email accounts (e.g. third party business accounts from third party service provider such as Bloomberg, Jabber, Refinitiv, Symphony, Microsoft Teams, and others); interactions between the user's email account and other datatypes (for example voice mail messages, audio and video call recordings of voice calls and video conferences they attended, text transcripts of audio calls and conferences, call data records, file transfers sent and received, etc.); data and summaries relating to the user's social media interactions (for example with Facebook, LinkedIn, Twitter, WhatsApp, etc.).

Figure 15:
FIG. 15 is a schematic diagram of a message display screen generated on a remote device accessing the search engine for an embodiment of FIG. 1.

A notable difference between email messages and non-email datatypes that have been converted to email messages is that non-email datatypes typically have additional metadata over email messages that further describe special structures and content of the converted data. For example, an email message can be viewed as a single event in time. As such, its single timestamp (as represented by contents of its "Date" header) is sufficient to sort and identify this email with other emails in the time dimension. Special datatypes, such as converted instant message histories from IM and chat systems (e.g. Global Relay Message, Bloomberg, Microsoft Teams, Refinitiv Messenger, etc.), may aggregate in one (aliased) email message, a collection of multiple instant messages over a fixed or variable interval of time. Each instant message of such a collection may be identified via its sequence number, sender alias, timestamp, optional reply-to a previously sent message sequence number, etc. It will be seen that these special datatypes may be decoded and then displayed or exported in a custom format that is more suited to its content. For example, FIG. 15 illustrates an exemplary display for special datatype #3 from Table 2 of "Vendor Message History". The special datatype may also provide additional metadata indicating other parameters, such as the start and ending time interval of the collection of contained messages or events, a thread-id which can be used to tie this collection to earlier and later instances of this ongoing conversation, participant lists, etc.

Regarding special datatypes it may be noted that additional metadata may be applied to datatypes other than instant message or chat histories. Datatypes representing voicemail, audio, or video recordings may be labeled by a start time and length of recording and may be displayed with a "playback" graphic control buttons to provide interfaces to activate typical playback functions (e.g. start playback, pause, stop, fast forward, reverse, volume control). Datatypes containing file attachments may be labeled with names, types, and sizes of files and are displayed with "download" and file sharing controls.

Generic email datatype and special datatypes may share a set of common headers of fields which enables clients, servers, and databases to process records in a uniform manner. Common headers are: "x-gr-datatype", Received, Subject, From, To, Date, Message-Id, and Reply-To. Additional headers may include CC, BCC, and other fields.

The association between a user's account and a history of an account's interaction for a particular datatype requires that the application have knowledge of and track the user's identity for that datatype. Different datatypes may use different aspects of the user's account and related information, where for example: email messages may be tracked via a user's account's email address; voice calls may use a phone number which is associated with the user (potentially either a virtual or a real mobile number or landline); social media accounts may use other handles, hashtags, or user-IDs.

For an embodiment, the messaging system implements processes to collect and store multiple identities associated with a user (and the user's account) and to associate these identities into a common (aliased) entity. For brevity, the process of establishing and making such associations is referred to herein as aliasing, where the user (and the user's accounts) have different aliases over data records having different datatypes (e.g. voice mails, text messages, other email accounts, etc.), but through aliasing, the aliases (namely the records having different datatypes) are associated to one interface (e.g. a mailbox for the user's account in the messaging system). By tracking a users aliases over different datatypes an embodiment may perform multiple, parallel searches over all available datatypes of this users accounts, and as such the user's historical interactions among multiple platforms, through the messaging account. In addition, at a global level, an embodiment may also aggregate a user's aliases with the other accounts that have communicated with the user's account, thereby creating a data set of multi-user disparate datatypes, which can then be accessed and searched by an embodiment to identify find non-email data. As an example of use of aliasing in an embodiment, the entity "user account" may be mapped to multiple "aliases", as shown in Table 2 showing exemplary aliases for accounts across various platforms under the name Vicky Sinclair:

With this structure, further details are now provided on searches for records for process 206a utilizing gestures for an embodiment, providing an overview of authentication and search processes.

For an embodiment, a search application may be initiated after a user has been authenticated to process 206a. Authentication is typically assessed directly using a username and password with an optional two-factor authentication, or otherwise using a single-sign-on (SSO) authentication system and the organization's Identity provider (IdP). After authentication, the user account is known to the system and thereby the user details and all available metadata such as user preferences, recent search history, etc. are downloaded to the application.

Figure 6:
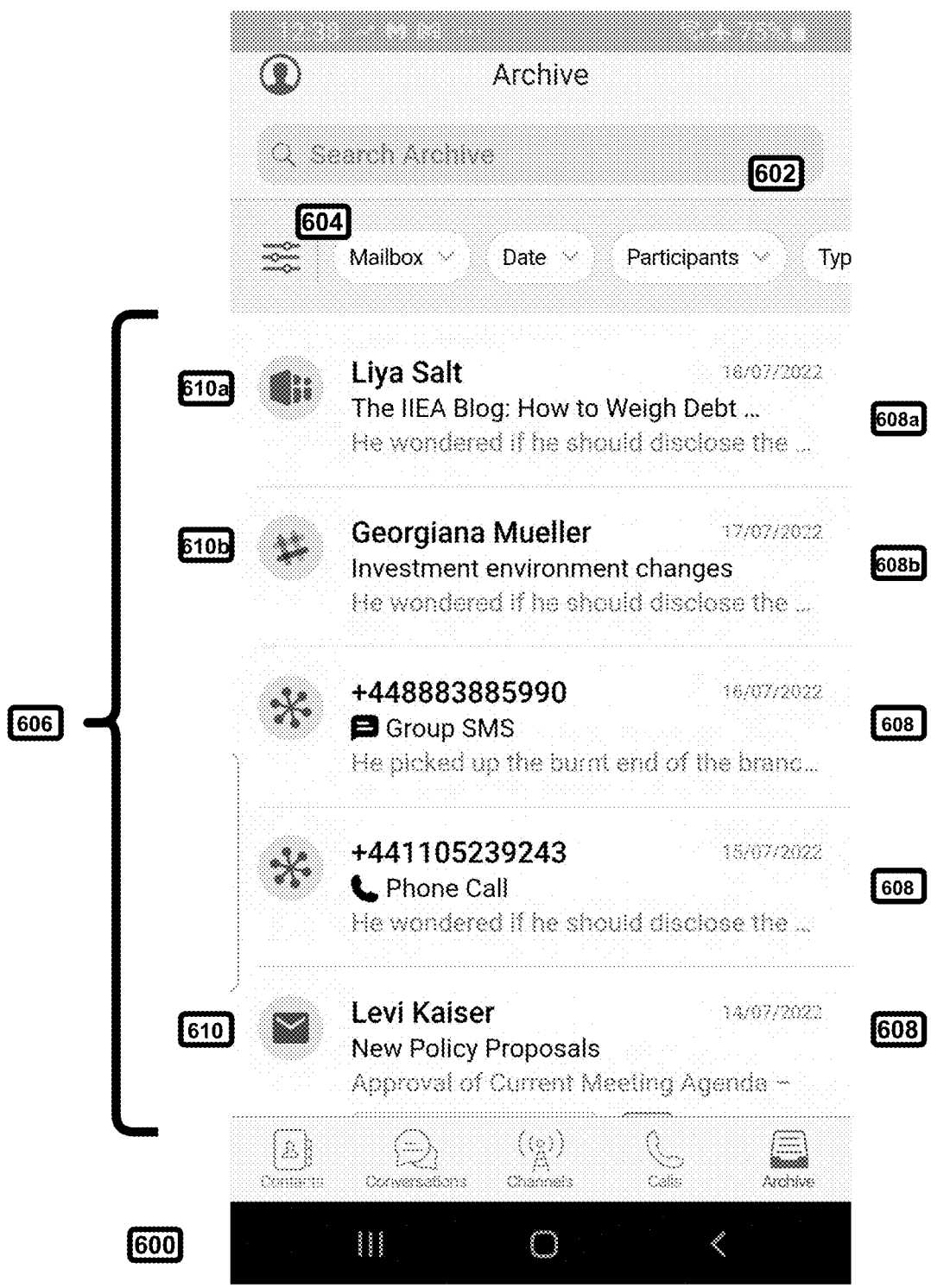
FIG. 6 is a schematic diagram of an archive screen generated on a remote device accessing the search engine for an embodiment of FIG. 1.

Referring to FIG. 6, features of an initial default search of data for a user's account are shown. For an embodiment, after authentication (and after other events as described herein), the application may perform a default search against the database and results of that search are generated on a user interface on the device as a list of items. It will be appreciated that at this instance, the user has not provided much (if any) substantive active input to the application (e.g. as information entered). Typically, an initial search result set will comprise the most recent N email messages available from the server's database where the user is listed as any participant (namely, any user listed in any To, From, CC, or BCC field) corresponding to the INBOX and SENT folders as if the user was operating an email client app connected to its account.

TABLE 2

Datatypes and Aliases for Vicky Sinclair

| Datatype # | Desc. | Datatype | Start | End | Alias Type | Alias |
|---|---|---|---|---|---|---|
| 1 | SMTP email | Email | Jan. 1, 2022 | Null | Primary email | vsinclair@compA.com |
| 2 | SMTP email | Email | Jan. 1, 2022 | Null | Secondary email | v.sinclair@compA.net |
| 3 | Vendor Message | Message | Jan. 1, 2022 | Null | Custom | 1236653@compE.com |
| 4 | SMS or MMS Text | TextMsg | Jan. 1, 2022 | Null | Virtual phone | 1-604-555-1212 |
| 5 | Bloomberg | Bmail | Jan. 1, 2022 | Null | Bloomberg | v.sinclair5347@bloomberg.net |
| 6 | Voicemail | Voice mail | Jan. 1, 2022 | null | Mobile phone | 1-604-555-1212 |
| 7 | Microsoft Teams | MSTeams | Jan. 1, 2022 | Null | Office365 | vicky.sinclair@compA.com |
| 8 | LinkedIn | LinkedIn | Jan. 1, 2022 | Null | LinkedIn URL | https://www.linkedin.com/in/vicky-sinclair-19a194/ |
| 9 | Twitter | Twitter | Jan. 1, 2022 | Null | Twitter | @vicky_s_394 |

In Table 2, Datatypes #1, 2 and 5 are grouped as generic "email" (or email equivalents) and Datatypes #3, 4, and 7-9 are identified as "special" datatypes (i.e. non-email), which contain aggregated collections of chat messages. In an example a search of the user account of "Vicky Sinclair" will return archive items associated with her aliases. In similar fashion, a search for one alias of "Vicky Sinclair" may be expanded to return messages to/from one or any of the associated other datatypes. For example, a search that initially specifies an alias "1236653@compE.com" of the datatype "Comp E Message" (i.e. the domain name of the target is the company Company E, so the datatype is a CompE message) may initially return only messages of that datatype. However, the results may also suggest searches for datatype "Twitter" messages using the alias "@vicky_s_394".

FIG. 6 shows screen image 600 generated on device 108 after the user has been authenticated and by default after the user has cleared all search filter criteria. Selected information and areas of image 600 are described below:

Keyword Search text entry (602): This area provides a field where text may be entered to serve as filter criteria for refining the search;

Filter Option Display (604): This area shows a list of the current filter criteria for types (and datatypes) of records to be searched. The list is extensible and horizontally scrollable by swiping left or right on the display area to show hidden filters. Each filter criterion is represented as a button or oval "pill" with a representative label. Available, but unselected, filters are shown in normal font. Selected filters, (namely filters which have been activated by the user) may be shown with a distinctive font or highlight or with a change to the label;

Search Results Display Area (606): This area below the Filter option display occupies a large portion of the remaining screen area and provides the main display area for search results showing details of retrieved records matching the initiated search results. Search result items are summarized and displayed vertically in a list. Each item has a datatype icon, sender, date, subject summary, and content summary;

Search Result Summaries (608): Individual search result items (documents, messages, or other tracked datatypes) are summarized and displayed as a list. A vertical scrollbar may be provided when the result list is too large to fit on the screen; and Datatype Icons (610): Datatype of each search result item may be identified by an icon or other graphic. It will be seen here, graphically, that different datatypes are shown in the initial search (emails, voicemails, text messages, and other interface discussions).

The application permits a user to modify search criteria using either a standard interface or gesture-based interface. Through a standard interface the user may enter additional search keywords into an input field using a virtual keyboard. Through a gesture-based interface, the user may input a gesture on device 108 (as described above) on the touch-screen. Both the standard and gesture-based interfaces may be used interchangeably and a combination of standard and gesture inputs may be entered by the user.

It will be appreciated that the summary information in screen 600 may be insufficient for the user to determine that the item is of relevance. Through the interface, more information on a particular item may be retrieved and viewed by the user inputting a "tap" gesture on the candidate item.

Once the item is recognized as being "tapped", the application marks the item as the "First Selected Item" and displays more details of the item in a full screen mode. The data and details are extracted from the stored data item in database 106.

Figure 7:
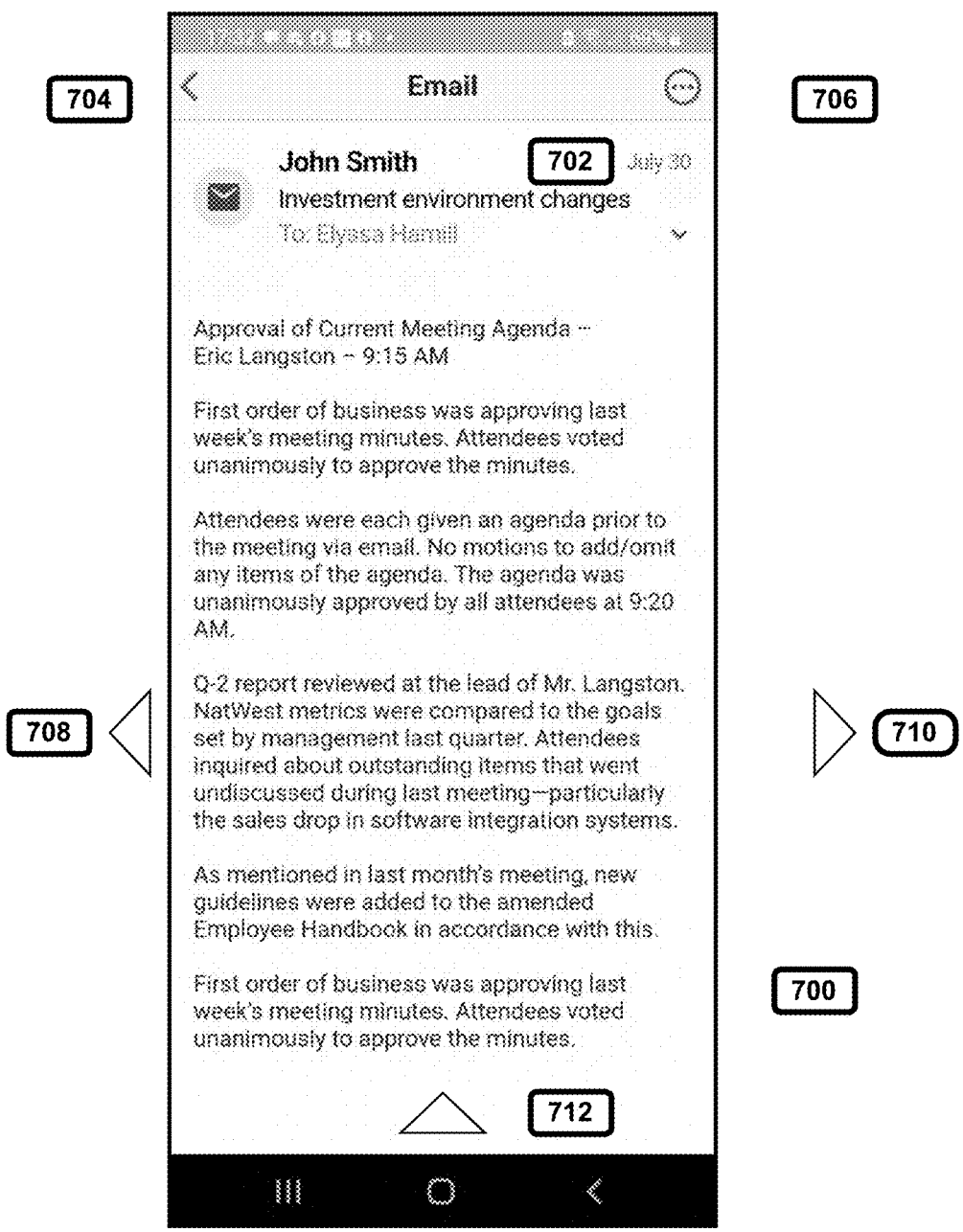
FIG. 7 is a schematic diagram of an email message display screen generated on a remote device accessing the search engine for an embodiment of FIG. 1.

FIG. 7 shows screenshot 700 of showing exemplary data relating to an item in full screen mode. Acceptable gestures as input signals here include at least:

Tap the "back" button ("<"), to return to the search result list view;

Tap the three-dot button, to activate additional settings;

"Swipe Left" gesture, to navigate to the next item;

"Swipe Right" gesture, to navigate to the previous item; and

"Swipe Up" gesture, to activate the Search Suggestions Overlay display.

These gestures represent a first set of gestures for their noted first set of commands. In FIG. 7, screenshot 700 shows:

Datatype Name field 702, showing details of the Item;

back or "<" button 704 icon, providing a graphic indicator that when "tapped" will return the display to the previous screen;

ellipsis (three dots enclosed in a circle) button 706, providing a graphic indicator that when activated will cause the user interface to display additional, contextual search filter settings, based in part on an analysis of the item's metadata;

Swipe Left icon 708, providing a graphic indicator for a left swipe gesture to navigate to the next item in the list;

Swipe Right icon 710, providing a graphic indicator for a right swipe gesture to navigate to the previous item in the list; and Swipe Up icon 712, providing a graphic indicator at the bottom which when provided causes the application to generate an overlay containing additional contextual search suggestions, based in part on an analysis of the item's metadata.

Figure 13:
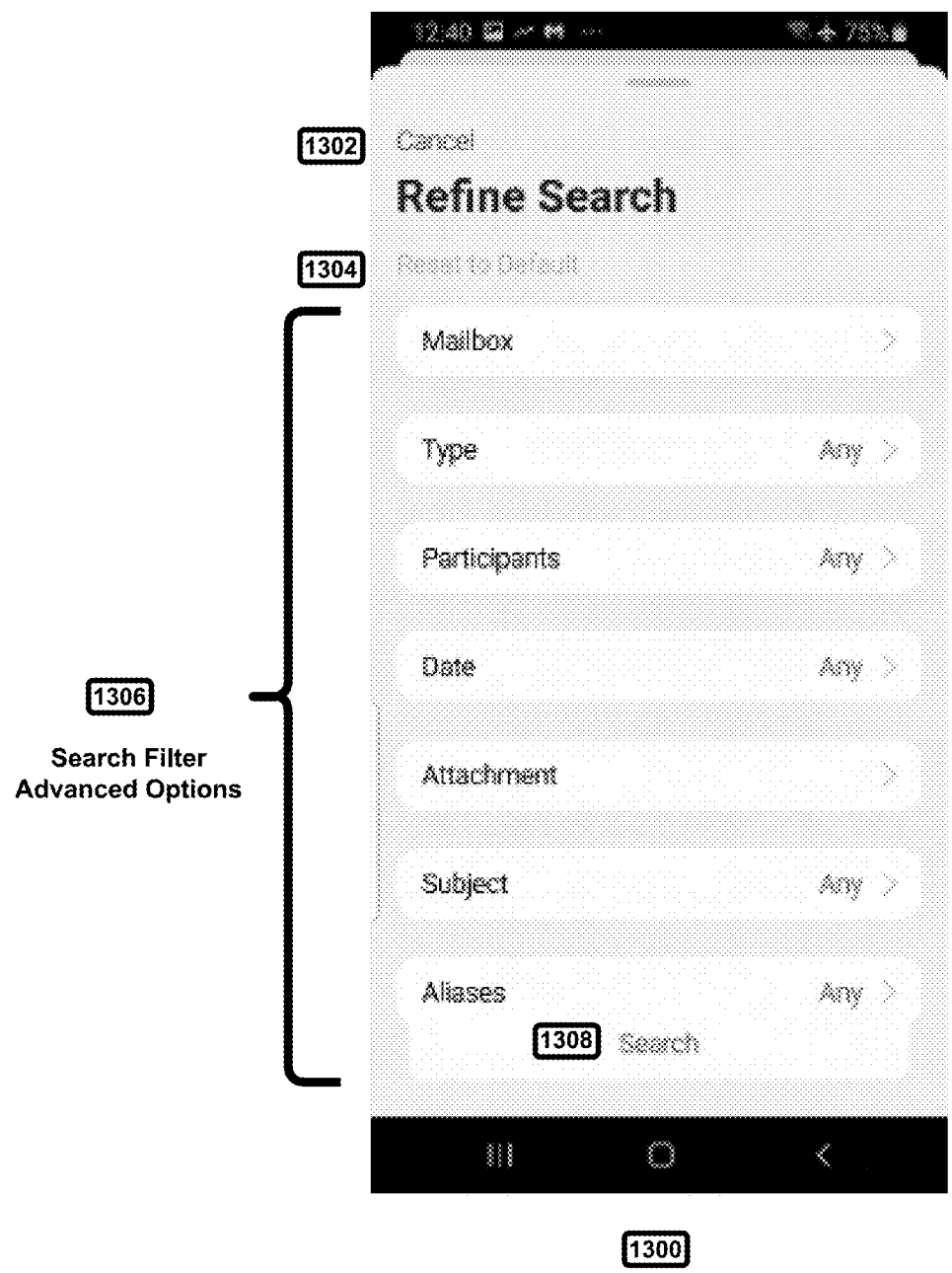
FIG. 13 is a schematic diagram of a refine search screen generated on a remote device accessing the search engine for an embodiment of FIG. 1.

When ellipsis button 706 is activated, the application will then generate a display a providing conventional Search Filter Options menu per FIG. 13. This is useful when the search suggestions presented in the screen do not provide desired options for the user enabling the user to enter additional information through conventional menu.

Figure 8:
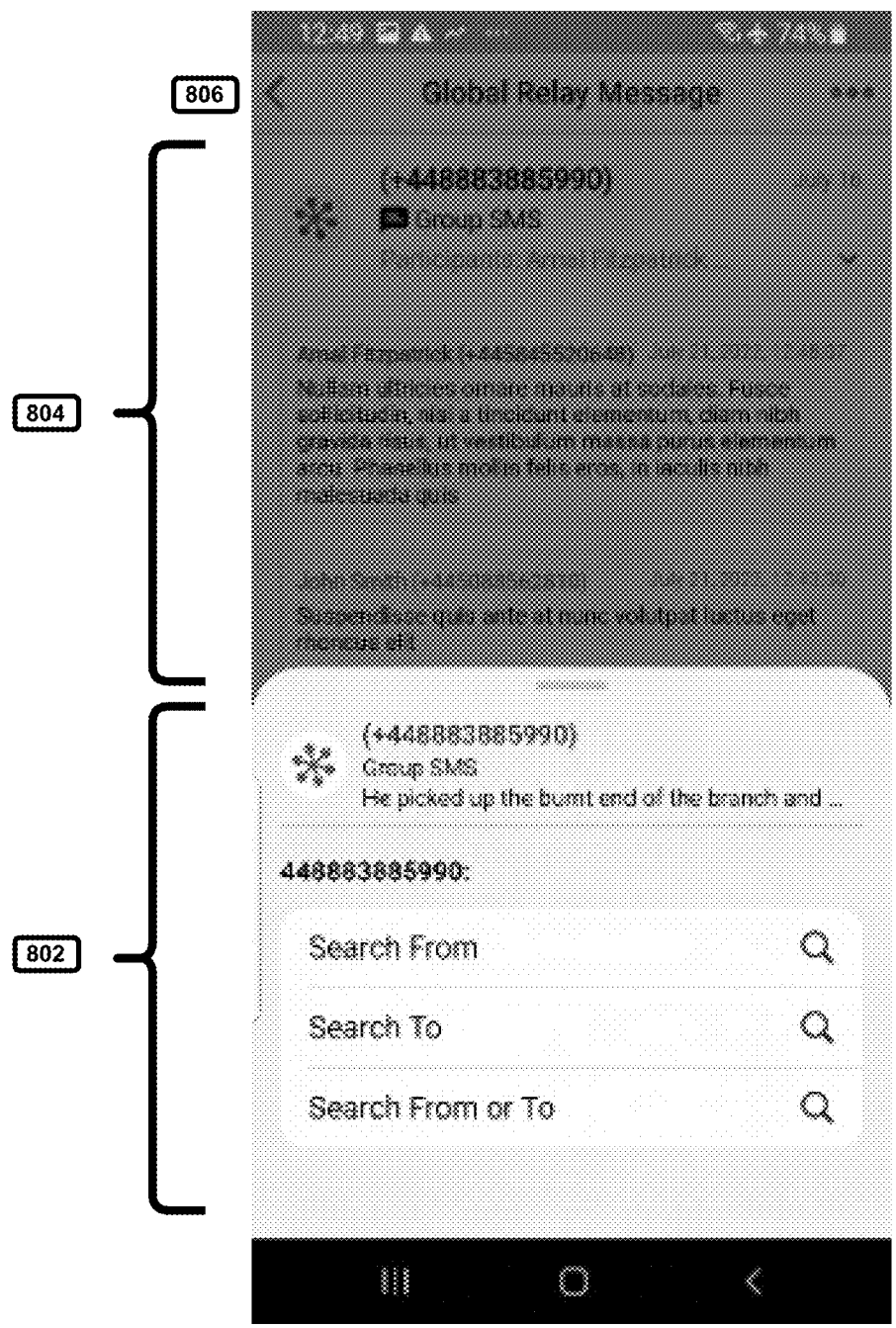
FIG. 8 is a schematic diagram of a message display screen with an overlay generated on a remote device accessing the search engine for an embodiment of FIG. 1.

Now, details are provided on actions and interfaces generated by an embodiment, when a "swipe up" gesture is received (per item 710). Referring to FIG. 8, after that swipe up gesture is received and processed, client 114 generates a new screen 800, providing an overlay of next-action suggestions and actions. The actions and suggestions are context-sensitive, based on the datatype of the originating item (e.g. email, text message, transcript, etc.). In screen 800, a second set of gestures is shown for their noted second set of commands. It will be appreciated that different second sets of gestures may be provided based on other gestures imparted just-previously (e.g. in FIG. 7).

First, details are provided on processes initiated at client 114, where from a search, client 114: analyzes the relevant datatype; initiates additional analysis of the datatype if it is determined to be a special datatype or a generic datatype for the search at hand (see Table 2 for examples of generic and special datatypes); resolves the identifier in the search; conducts (statistical) analysis on the search results; and ranks and presents the results on client 114 with a further menu of gesture-accessible options. FIG. 15 shows a display of an exemplary "special" datatype, here, a group SMS. The display format for "special" datatypes may be varied to show the individual chat messages as individual sections each with sender identity, timestamp and content.

For the search, following is an exemplary sequence of actions and events implemented by and between client 114 and messaging system 206 when resolving an identifier in a searched item presented on client 114. In context, on client 114, the GUI is displaying an item and the user is about to "swipe up" on the item, indicating interest by the user in obtaining additional search suggestions based on the item. In identifying additional contextual information on the item, client 114 evaluates the item's headers, here the "x-gr-datatype", "to", "from", "date", "cc", "bcc", "subject", and other headers depending on the value of x-gr-datatype.

The "to", "from", "cc", and "bcc" headers contain identifiers which may list addresses or aliases that identify participants of potentially related archived items of the current datatype.

In an embodiment, identifiers are broadly categorized as either: a Group, an Internal, an External, or a Community identifier. Table 3 provides a sample of items in the contact list for the exemplary user Vicky Sinclair (whose aliases are shown in Table 2). Group identifiers (e.g. Table 3, identifiers #1-3) may be stored and retrieved within process 206a or may be maintained independently at client 114 or elsewhere. Each group names and collects a user- or system-defined set of the other types of user identifiers.

TABLE 3

| Id | Name | Contact Type | Favorite | Company | Email | Phone |
|---|---|---|---|---|---|---|
| 1 | @investors | group | Yes | external | | |
| 2 | @team_sales | group | Yes | Company A | | |
| 3 | @team_support | group | No | Company A | | |
| 4 | Addie Gilette | internal | No | Company A | addie.gilette@compA.com | |
| 5 | Amal Fitzpatrick | external | Yes | Company B | amal.fitzpatrick@compB.com | |
| 6 | Araceli Cornelius | internal | No | Company A | araceli.cornelius@compA.com | |
| 7 | Benito Fuller | external | Yes | Company C | benito.fuller@concao.com | +1-212-555-1212 |
| 8 | Bertie Jennings | external | Yes | private investor | bertie.jennings@gmail.com | +1-902-555-2121 |
| 9 | Candice Poland | community | Yes | Company D | candice.poland@compB.com | +1-604-720-1000 |
| 10 | Douglas Coward | community | Yes | Company D | douglas.coward@compB.com | +1-604-720-1000 |
| 11 | Elissa Hamill | external | No | private investor | elissa.hamill@yahoo.com | +443607311452 |
| 12 | Marc Driscoll | internal | Yes | Company A | marc.driscoll@compA.com | |
| | | | | System-wide Domain to Organization Mappings | | |
| 13 | CompA.com | domain | | Company A | | |
| 14 | CompB.biz | domain | | Company B | | |
| 15 | CompC.us | domain | | Company C | | |
| 16 | CompD.com | domain | | Company D | | |

Exemplary types of identifiers are internal, external, and community identifiers. Internal identifiers (e.g. in Table 3, identifiers #4, #6, and #12) are retrieved from data within process 206a and its database, which maintains an organization-wide directory of identifiers and mappings to participants, as aliases. For mapping purposes, these identifiers are characterized as internal identifiers, where internal identifiers are sourced from the organization's internal sources, for example its LDAP or Active Directory. As such, result items containing identifiers of the user's organization may be mapped to other items. External identifiers (e.g. Table 3, identifiers #5, 7, 8, and 11) are sourced independently by client 114. Such sources may include: a personal contact list maintained by client 114, contact lists (e.g. mobile phone contacts) generally maintained by other applications on the mobile device, or other contact lists accessible to this client 114 (as logged in by its user). Since the user may manage these contact lists at client 114 directly, client 114 may augment its aliases for a sender or recipient. For each identifier, client 114 performs lookups against available contact lists (both internal and external), resulting in a combined list of all types of contact information (both personal and organization-supplied). Community identifiers (e.g. Table 3, identifiers #9 and 10) are retrieved from data within process 206a, but which are not of the same organization as the current logged in user. Process 206a maintains an organization-wide directory of identifiers and mappings to participants for multiple organizations, as a community of organizations, and may grant selective access of a portion a given organization's directory to other organizations which comprise the community. As a result these identities and a subset of their aliases become accessible to the other organizations of the community.

If an identifier (e.g. an Internal identifier) represents a member of the same organization as the logged-in user then a lookup of the identifier in the organization's directory may succeed and return the user account and a set of its related identifiers (aliases). If an identifier is an externally-managed identifier then a lookup of the identifier in contact lists stored on client 114 or accessible over a network to this logged-in user may succeed and return contact record or Vcard and a set of its related identifiers. If an identifier is a Community identifier then a lookup from data within process 206a may succeed and return contact record or Vcard and a set of related identifiers for this identifier. In this way a collection of identifiers (aliases) and accounts or Vcards is obtained for each user.

Also, identifiers may identify multiple items, such as under a group identifier or those in a compound string (in the form of user@domain), or in other structured data. Groups (e.g. Table 3, identifiers #1-3) may be resolved to their members. Domains may be parsed from the structure of certain identifiers such as email addresses and may be used to identify the corresponding organizations by reference to system wide domain mapping tables (e.g. Table 3, identifiers #13-16).

Each item in the user's contact list may be marked as a Favorite which is a flag known only to the user. The Favorite flag may be used as a factor for sorting the contact list for display purposes. The Favorite flag may be used as a factor for relevancy ranking and sorting of the search results in client 114.

A next process in resolving an identifier involves data analysis on results provided. Herein, client 114 may request from process 206a a count of items available from process 206a, grouped by a selected parameter (e.g. grouped by a parameter in the account, such as its organization, group, or user account, and/or grouped by datatype). These results may be filtered (e.g. by a date range if a "date range" filter is being applied). Client 114 may use the count of items to assign weighting factors to the user accounts and/or datatypes when producing the results.

The last process in resolving an identifier involves presenting the results of the search on client 114. In this process, client 114 organizes a set of search suggestions to be presented as options to further refine or expand the search. Typically, in organizing the results, client 114 assesses several parameters, such as: preset preferences of the user of client 114; number of search suggestions presentable on the screen of client 114; the direction of message flow (To, From, or To & From); and statistical weighting factors by organization/group/user. It will be appreciated that an embodiment will provide on client 114 a set of suggestions for organizing the results. In one embodiment, client 114 presents three groups of suggestions: a first group (here three suggestions) focusing on the sender of the item but expanding the filter to include all datatypes To, From, and To and From the sender's composite set of aliases from all sources; a second group focusing on the sender's group or domain but expanding the filter to include all group or domain members;

and a third group specific to the datatype of the selected item. For email: a search by message subject; for Twitter a search by message thread, etc.

For the example as shown, process 206a provides metadata that client 114 uses to produce search suggestions either integral with the search result items or more usually as separate lookups. It will be appreciated that in other embodiments, processing performed by client 114 may also be conducted by process 206a. Alternatively, the processing performed by client 114 and the server can be allocated in a different manner.

It will be appreciated that in a more generic implementation, alternative labels may be provided to various data fields. For example, the two labels "Search To" and "To Sender" practically refer to the same field, so an alternative label for both could be "To <placeholder>" or the like, as the action to search is implicitly understood. Similarly, the two labels "Search From" and "From Sender" may both be replaced by an alternative label "From <placeholder>".

As well, it will be understood that the phrase "To and From" means that the results set includes both results of the "To" search (and optional "CC" and "BCC" headers if present) and "From" search, which is logically the OR-combination of message participant search terms to the search engine.

It will be appreciated that using a sequence of sets of gestures (where a current set of gestures is determined from a previously received gesture) a user can quickly refine the search criteria in complex, yet well-defined and meaningful ways. The sequence of gesture actions may define a linked, consistent gesture-theme for the sequence. For example, sequential "swipe left" gestures (or other repeated gestures) may provide a default, similar next action that is to be conducted on the current record. Table 5 and the related description provides further context on sequences of gestures.

Further detail is provided on different information that is extractable from a datatype and how that different information may be used by an embodiment in generating and selecting search results. For example, a transcript datatype will typically have different information than an email datatype and will accordingly have a differently formatted display and contents for its overlay compared to an overlay for an email. For screen 800 for a transcript datatype, the following items are generated and shown (again after accessing the item's data and metadata):

Search Suggestions overlay 802 provides a datatype-customized list of searching suggestions. Clicking on one of the suggestions modifies the search filter and returns the display to the list of search results that are obtained from the search query engine for that filter, which may include additional results after accessing and analyzing relevant metadata and aliased items. Again, these additional results are generated after accessing metadata, which ultimately utilizes aliases;

First Selected Message area 804 here shows "grayed-out" text indicating it is not the current focus. However tapping or touching this area returns to the previous display; and "Back" button icon 806 provides a graphic indicator for tapping or touching to return to the previous display.

Figure 9:
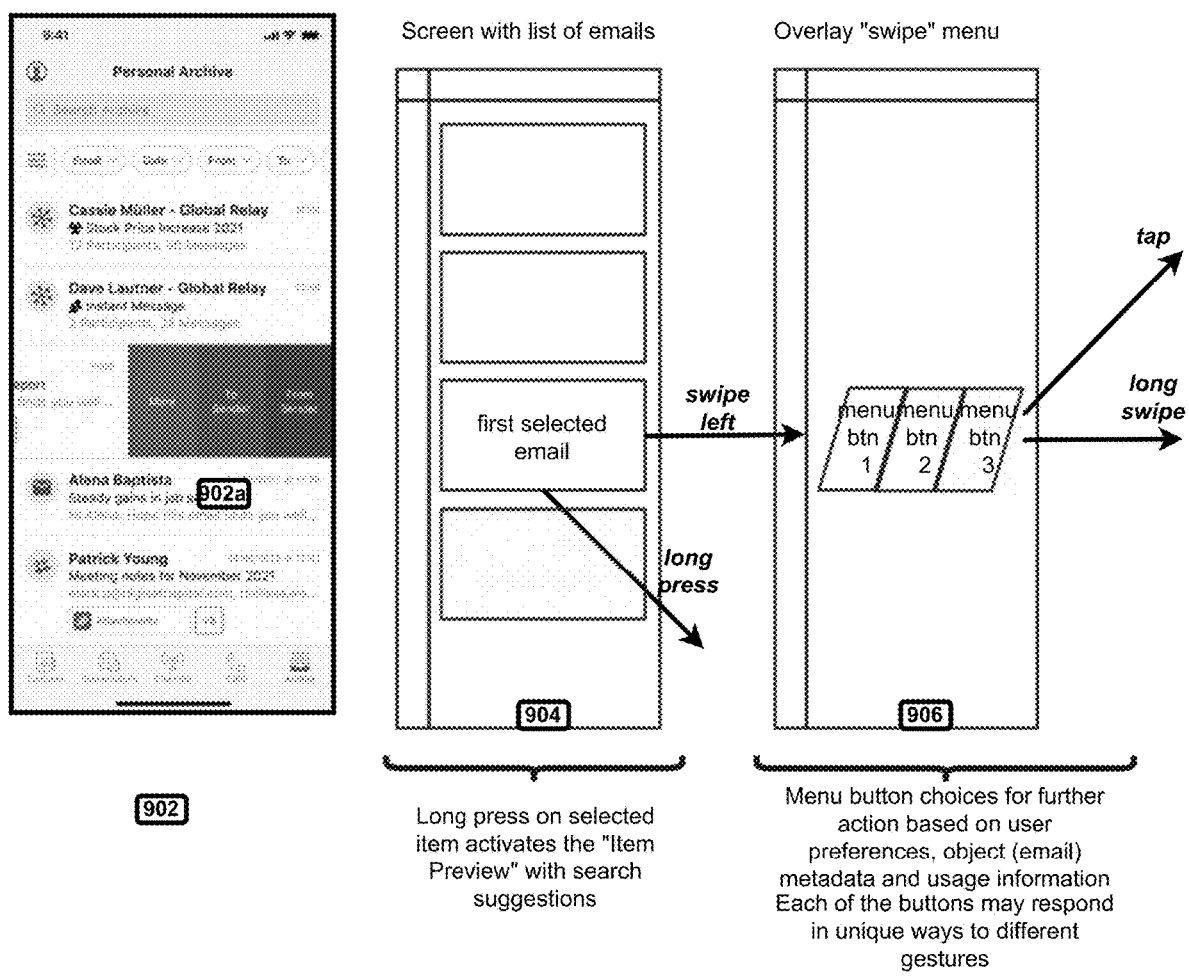
FIG. 9 is a schematic diagram of a progression of archive display screens generated on a remote device accessing the search engine for an embodiment of FIG. 1.

Next, details are provided on how the application processes actions relating to the selected item. Referring to FIG. 9, details are provided on a "Swipe Left" action (icon 706, FIG. 7). The touched item is again referred to as the First Selected Item.

For an embodiment, a "Swipe Left" gesture initiates a series of linked, context-dependent actions generated by the application. This gesture initiates the overlay of a menu containing several additional buttons. In the example in overlay 902, three buttons appear from the right of the screen as the first selected item shifts to the left or the first selected item is overlaid by the button menu. In the example an extended sequence of gestures may be: (1) swipe left the first selected item; (2) observe the overlay of three buttons labeled "More", "To Sender", "From Sender"; or (3) move to the first button (labeled "More") and tap it to activate its "tap" action.

FIG. 9 illustrates a progression of sequential screens and actions generated by the application during a "swipe left" gesture starting from a search result summary screen (described earlier with respect to FIG. 6). In FIG. 9, screen 902 of the application is shown, with subsequent screens 904 and 906 presented as wireframes of subsequent screens illustrating a search command progression (through sequential sets of gestures and related commands). For context and graphical abstractions, a wireframes is simplified graphical versions of a screen, where only relevant details (as abstracted) are shown. In wireframes as shown, geometric shapes show outlines of GUI buttons presented in actual screens. For example, in the wireframes, parallelograms represent GUI buttons and connote motion or "blur" as they slide in from the right.

Wireframe 904 shows the same "swipe left" gesture in schematic form with the corresponding actions.

Additionally, wireframe 906 shows that each of the buttons may respond to a tap gesture, or that the entire overlay may respond to additional gestures such as a "long swipe". Additionally, starting from the first selected item, the user can invoke gesture "long press" on the item.

For a context-dependent action, per overlay 902a, the More button may initiate a request to the application to provide additional information using the Item Preview Display, described below. The "To Sender" and "From Sender" buttons may be activated to initiate an action to modify the search criteria to filter on items that were sent to or received from the same participant as the first selected item's sender. As context-sensitive commands, activation of either of these buttons may cause the application to immediately perform their action, initiate a new search to be performed, and return the filtered results as requested. For example, if the "To sender" button is activated, a search would be conducted for datatypes having the recipient as being the noted sender and the results would be returned.

In general, for a given first selected item, the application may use several factors to determine which and what actions and related menu buttons should be presented in the user interface. Exemplary factors include: user preferences about the type and order of the buttons; the datatype of item, metadata about the item such as category, date, flags, folder location, direction of participation (i.e. "To": the user, "From": the user, or CC:), attachments, encryption, and other factors; and data about the user's search history. These results are provided in part from accessing metadata and aliases to provide context and more information of semantic meanings of different header fields such as "From", "To", "CC", and "BCC".

As an additional context, each overlay menu button may have a different action from its others depending on the type gesture that is applied to it. For example different actions for a button may be provided if the detected gesture is a tap, a long press, a swipe, or others. It will be appreciated that for an embodiment, different actions are provided when the detected action is a tap, a long press, a swipe right, or a swipe left.

It will be seen that a user with training may perform each sequence of gestures as series of smooth motions which, along with visual and haptic feedback from the device, becoming an instinctive part of the user's routine in navigating through the application.

Figure 10:
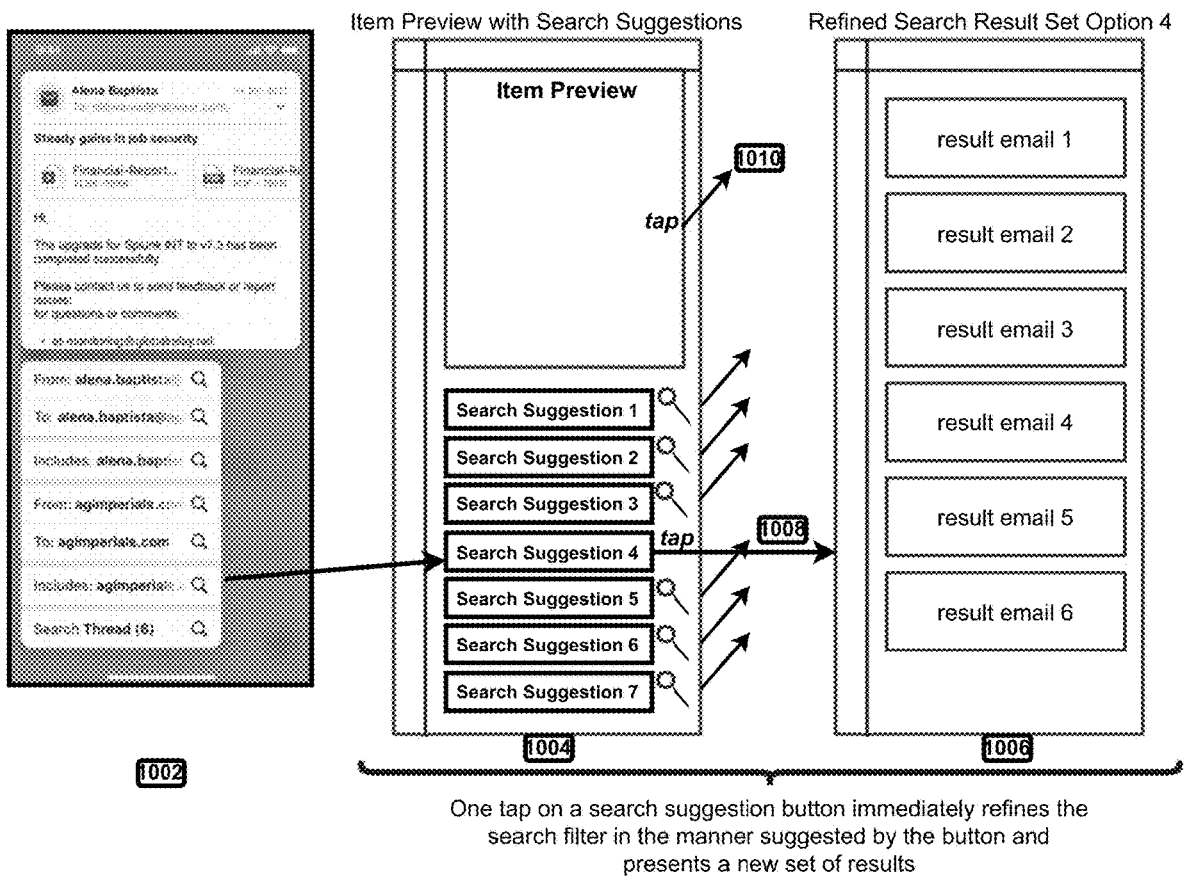
FIG. 10 is a schematic diagram of a progression of item preview screens generated on a remote device accessing the search engine for an embodiment of FIG. 1.

Next, referring to FIG. 10, further details are provided on generation and navigation though an Item Preview Display (which may have been activated after activation of the More overlay 902a in FIG. 9).

With typical search result items such as email there are a number of commonly used search suggestions. These are suggested by the system to the end-user in this screen. On the Preview Item Display, examples of some search suggestions relevant to the first selected email include: (1) search for emails from the same sender; (2) search for emails to the same sender (i.e. reply messages); (3) search for other emails which include the sender as a recipient; (4) search for email from the same organization as the sender; (5) search for emails to the same organization as the sender, (6) search for emails in the same thread as this email; and (7) search for emails containing similar subject words.

FIG. 10 shows screen 1002 of the application with additional features contexts shown in wireframes 1004 and 1006. Screen 1002 shows an updated display with an overlay providing a preview of the item in the top half of screen 1002 with a list of search suggestions displayed as a vertical list of labeled buttons in the bottom half of screen 1002. Wireframe 1004 is an abstracted view of screen 1002, showing additional search contexts for items shown on screen 1002. Notably Wireframe 1004 shows the "tap" gesture actions that are possible to perform on the overlay.

From screen 1002, the application can wait for a gesture to be provided on device 108. If a "tap" gesture is detected, then depending on what item in screen 1002 was "tapped", different actions may be taken. The email items shown in the bottom portion of screen 1002 show emails relating to the entity "agimperials", which is a nickname for compD (for Company D) as used in the Tables and related descriptions herein.

For example, a tap on one of the suggested search options, such as "Search Suggestion 4" 1008 will cause the application to dismiss the overlay screen, refine the search criteria in the manner indicated by the stated suggestion, perform another search to the backend search engine, and present to the user a refined search result, as shown in wireframe 1006.

Alternatively a tap on the item preview portion of the display 1010 causes the application to invoke additional actions, here for example to move to the Advanced Search display (per FIG. 12 described below).

It will be appreciated that underlying the results and processes shown in FIG. 10 implement dynamically creating for search suggestions, based on an analysis of data, metadata, and aliases relating to the shown item. As previously mentioned, in processing a searched item and producing contextual results, an embodiment has processes to: reflect on the datatype of the selected item; identify whether special treatment can or should be conducted on the datatype (if recognized) or whether to process the item as a generic (email) treatment if not; resolve the identifier; conduct statistical analysis on the search results; and rank and present a menu of gesture-accessible options relating to the results.

It will be appreciated that for the specific email example shown, other embodiments may implement a parametric substitution of <values> into <label: $placeholder> strings with a ranking/sorting/clustering of items.

As a general overview, for a datatype an embodiment can generate a ranked table of candidate search suggestions. Each candidate search suggestion typically has a formatted string with fixed and variable portions, where the variable portions are used as placeholders. An embodiment extracts from the first selected item on display relevant values to be substituted in place of placeholders. Alternatively, preset analytical tools may identify derived values for placeholders.

Next, details are provided on how the application processes actions after a search suggestion has been applied (for example by tapping a suggestion 704 in described above for FIG. 7.

Figure 11:
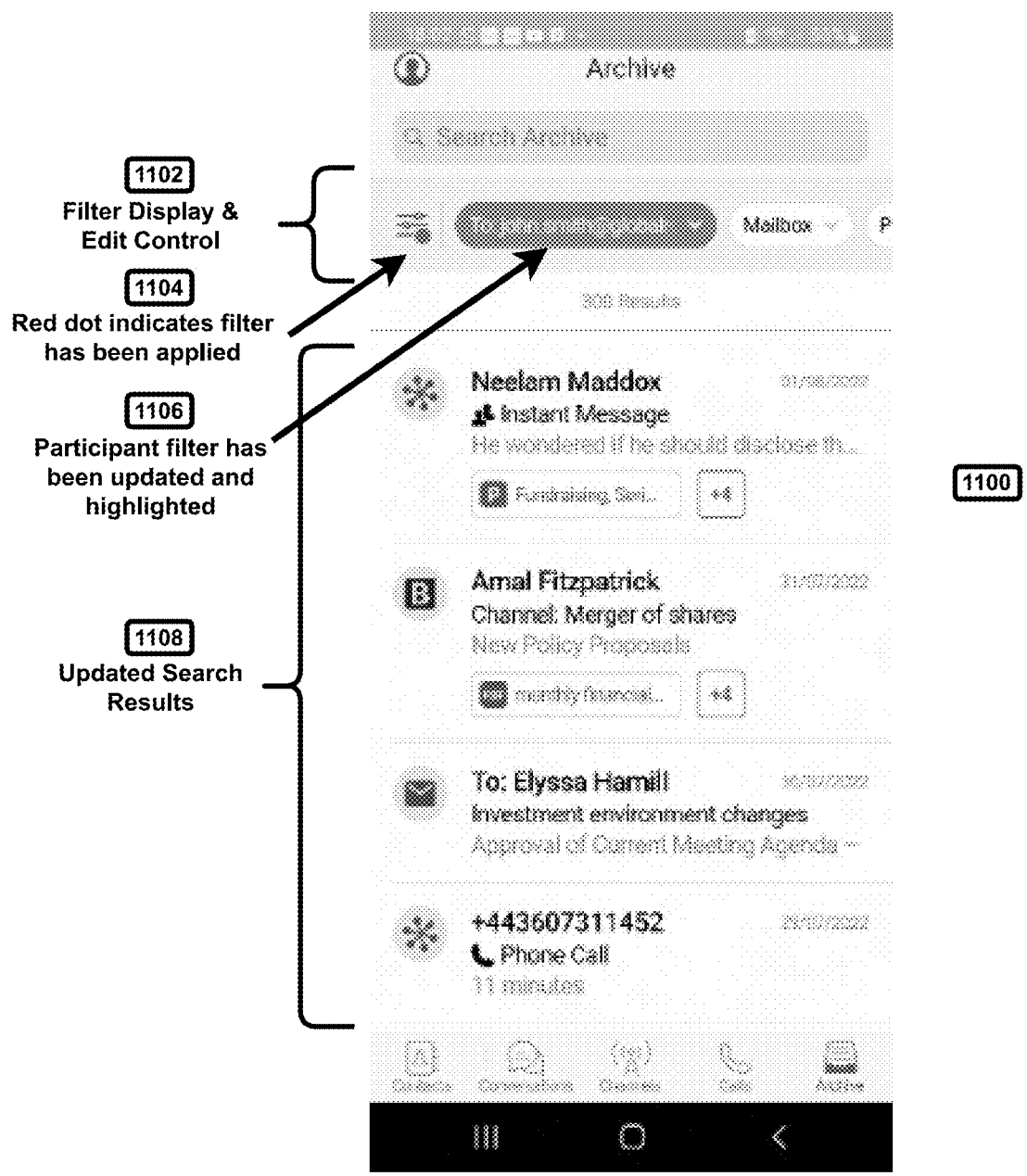
FIG. 11 is a schematic diagram of an archive message screen generated on a remote device accessing the search engine for an embodiment of FIG. 1.

FIG. 11 shows exemplary screen 1100 generated after the user has clicked on the search suggestion label "To: john.smith@globalrelay.net" with placeholders resolved and filters applied.

In screen 1100, the Filter Display and Edit Control field 1102 is updated to indicate the change in filter criteria. A red dot is added to the filter icon 1104 left of list of filter criteria to indicate that one or more of the available filters has been applied. The participant filter pill icon 1106 is highlighted and updated to indicate "To: john.smith@globalrelay.com" in the label. The updated list of search result items 1106 is displayed in the remaining portion of the display. The user may then execute additional gestures on a different first selected item or perform actions using the other controls of the display.

Next, further detail is provided on an Advanced Search Display. If the prior list of search suggestions is not sufficient the user may tap on the Item Preview shown at the top of the Item Preview Display. This switches the app to the Advanced Search Display.

Figure 12:
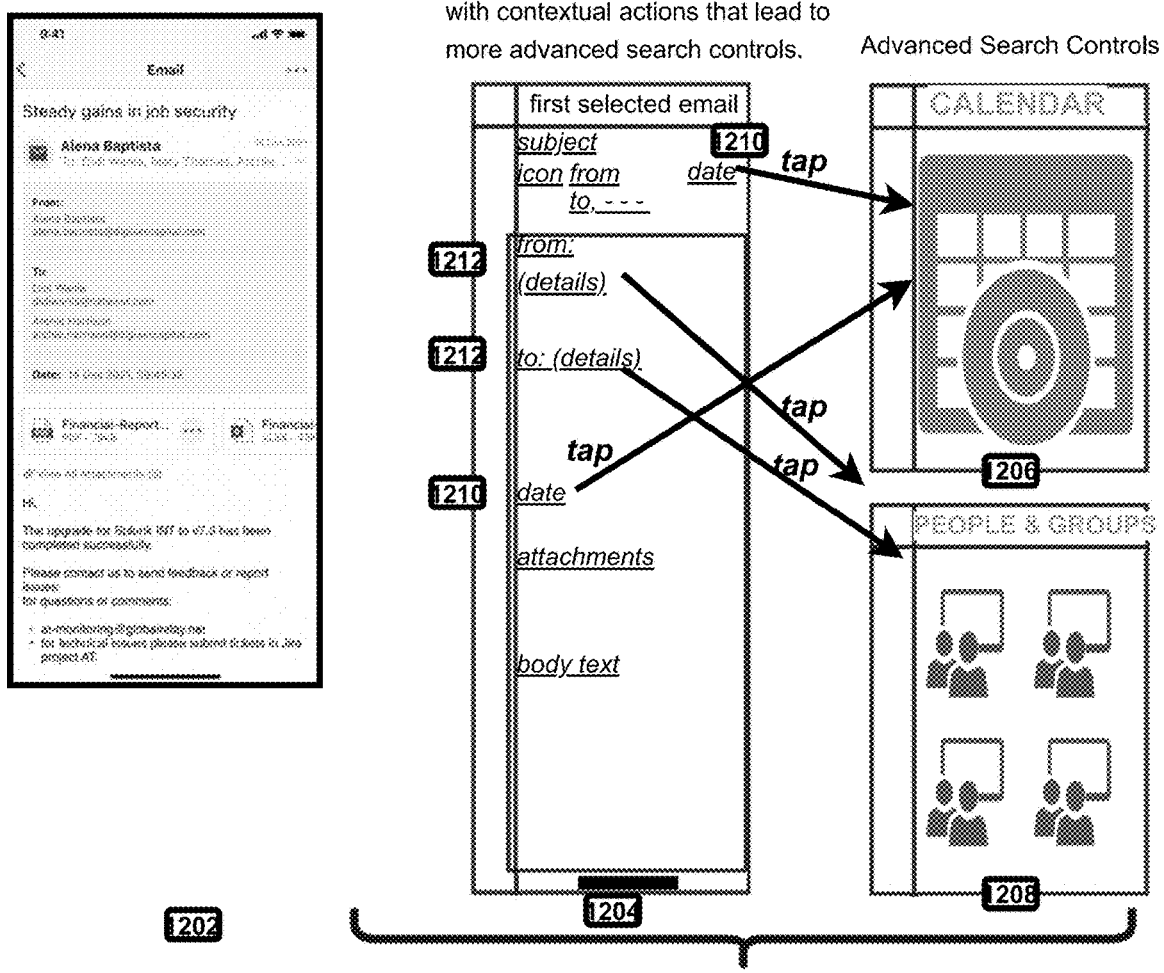
FIG. 12 is a schematic diagram of a progression of advanced search view screens generated on a remote device accessing the search engine for an embodiment of FIG. 1.

Referring to FIG. 12, when none of the search suggestions generated by the application are adequate, the user may activate the Advanced Search Display button. The advanced display may be activated several ways, including: by a multi-sequence gesture (for example a Long Press a First Selected Item, followed by Preview Item Display, then tap on the Preview Item); or by a direct action (for example a Swipe Left on the First Selected Item, then tap the "more" Button to reach the Preview Item Display, then tap on the Preview Item).

Once the Advanced Search Display is obtained, the application parses data related to the selected item and its metadata to identify data items to be displayed. The displayed items may be shown as URLs and/or in "hotspots", which are regions on the screen of the item that are designated to accept user input or gestures (and then take appropriate actions related to such inputs). A hotspot is a region of the display that is graphically reactive to gesture actions. It is graphically marked by a change in one or more of the visual aspects for presentation of an item in the region such as: the color of the font, underlining of the font, or italic, bold style of the font, change in the region's background color or shading, the color or line thickness of the border of the region. For small items the reactive area of the hotspot may extend beyond the visual aspect of the item. Visual aspects of the hotspot may be configurable as part of the application's display preferences settings (e.g. dark mode) or left to standards for displays for device 108.

Figure 16:
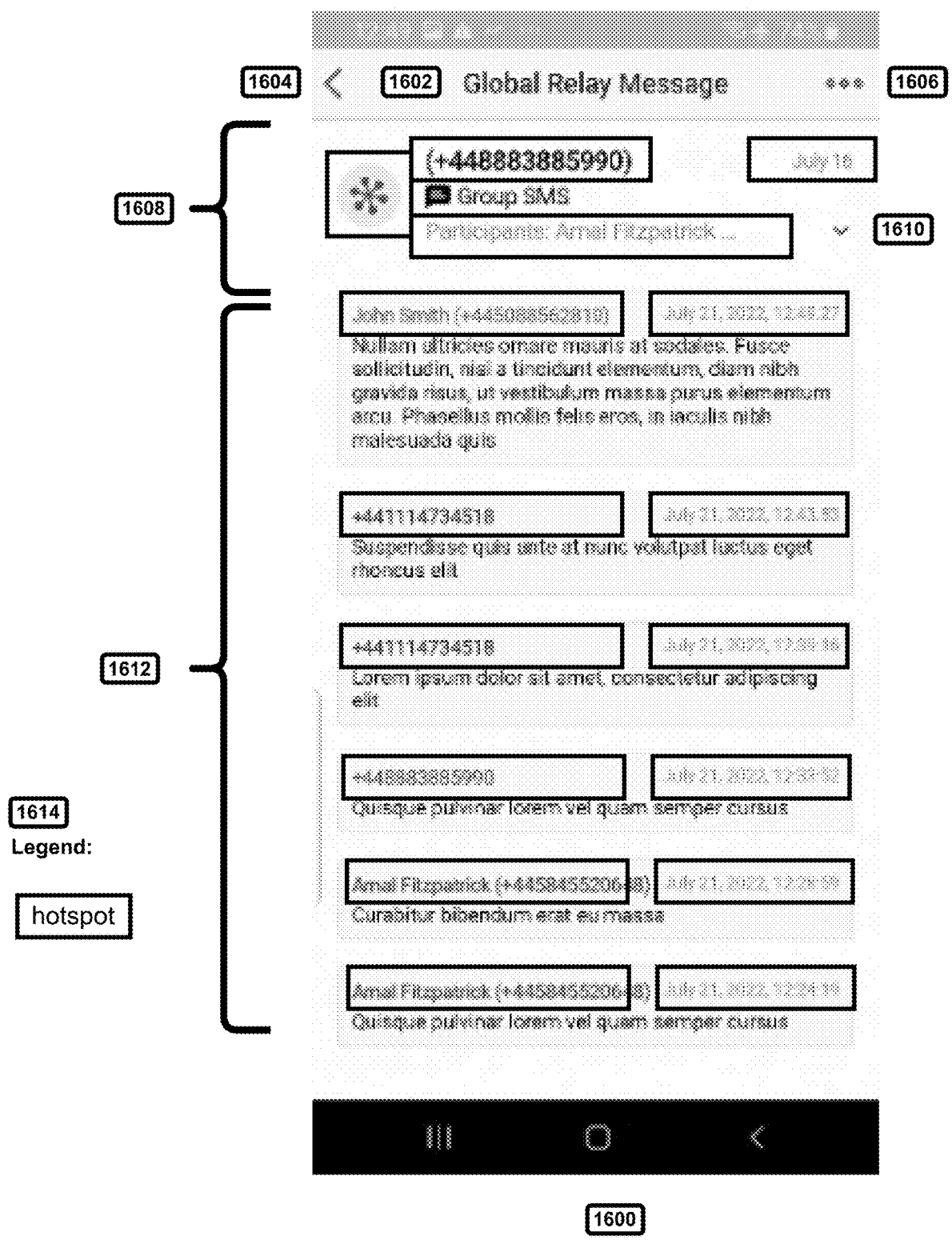
FIG. 16 is a schematic diagram of another message display screen generated on a remote device accessing the search engine for an embodiment of FIG. 1'
Figure 17:
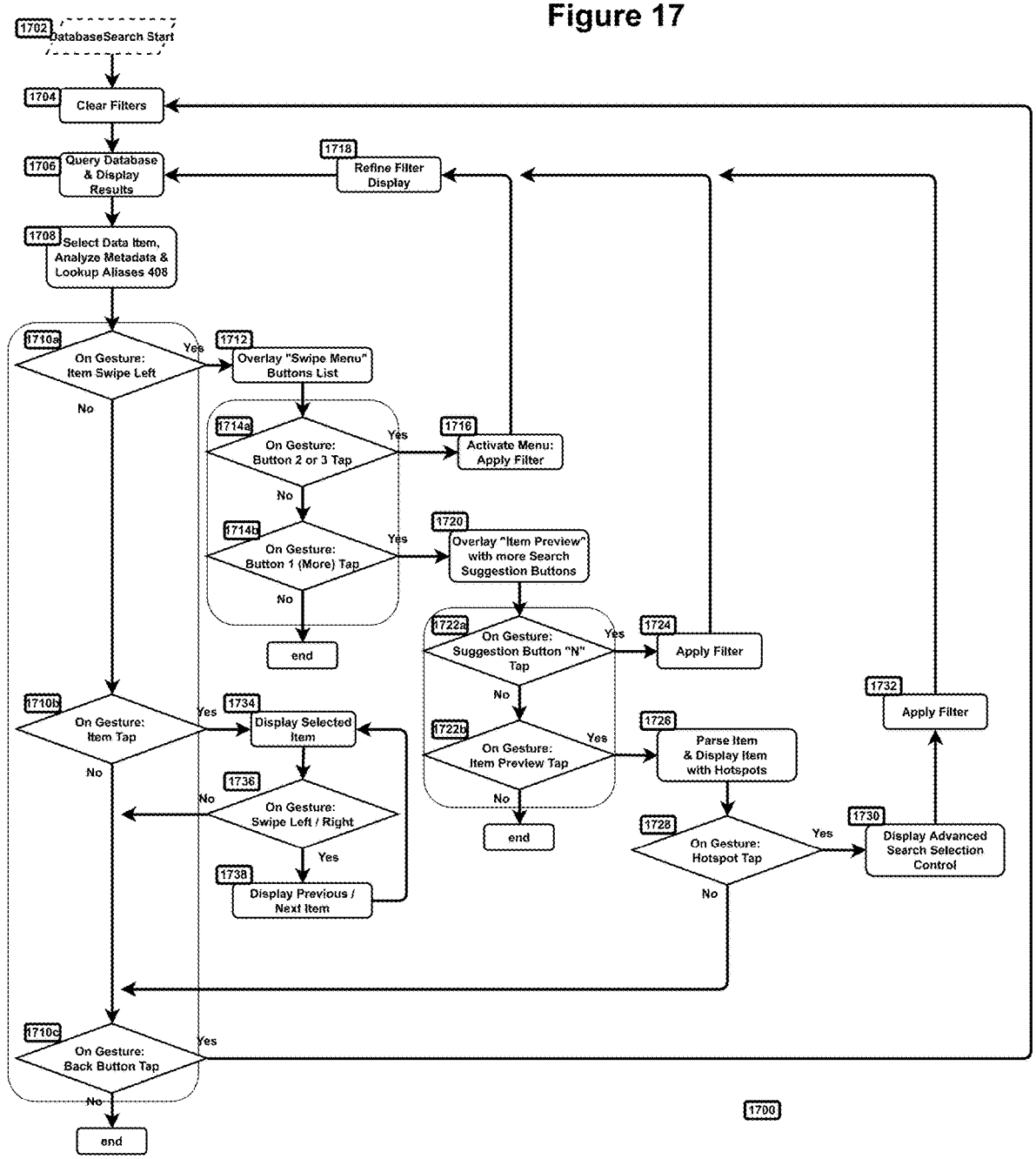
FIG. 17 is a block diagram of a search algorithm using gestures as implemented by the search engine for an embodiment of FIG. 1.

FIG. 12 shows a representative item of email datatype in the Advanced Search Display. FIG. 16 shows an Advanced Search Display for a datatype of particular group chat message (which is not an email). In FIG. 12 screenshot 1202 is shown with subsequently generated wireframes 1204, 1206 and 1208 illustrating feature of advanced displays.

Wireframe 1202 shows an item's hotspots as underlined labels. Providing a tap gesture on a hotspot in one embodiment activates a corresponding advanced search control which overlays a portion of the current display. Alternatively the formatting of the hotspot may be as a URL.

For one progression, providing a tap on a date field 1210 causes the application to generate a calendar control screen 1206, which displays the current date range along with a calendar wheel. The application may accept as commands various gestures relating to the wheel, including: circling left or right contracts or expands the associated date range; swiping left or right on the wheel shifts causes the application to change date range backward or forward.

Similarly, a tap or other gesture on the "To:" or "From:" hotpots 1212 causes the application to generate a directory browser control screen 1208 displaying current selections of participants and a related organization's list of available participants and groups. These details are determined by a search of the related items and an analysis to determine same. The directory control may respond to gestures to add or remove participants from the current selection.

Briefly, an algorithm for processing advanced search with hotspots and URLs is described as follows:

1. The First Selected Item's data is parsed and its contents and metadata are extracted and analysed to derive additional search suggestions. Each search suggestion may be derived from selection and permutation of current filter criteria and the First Selected Item's metadata. Each search suggestion is typically formatted for display as a clickable URL or a button in the touch screen;
2. The application expands the view of the First Selected Item. The First Selected Item may include a scrolling option if the contents are larger than the content display area; and
3. If the user taps on one of the URLs or buttons the application applies overlays to the current display with an advanced search control. The user interacts with the advanced search control, and either accepts the changes or cancels the popup. The application may then apply the filter changes as required.

Following are examples of hotspots/touch-sensitive areas which may be generated and display providing areas to select additional filter criteria:

a) Fields for dates displaying a calendar for selection of date ranges;
b) Fields for names, group names, and distribution lists displaying a directory of available names;
c) Fields for attachments displaying a list of attachment types (.TXT, .DOCX, .PDF, .XLSX, etc.);
d) Folder fields displaying a list of available folders (INBOX, SENT, custom folders); and
e) Subject line field displaying choices to follow or not follow this thread of conversation.

It will be appreciated that for an embodiment, identification and generation of a URL or hotspot provides a data-specific Advanced Search parameters as opposed to an interface providing a list of pre-computed search suggestions.

For example as a context-specific next action, a tap on a hotspot centered on a date within an item can cause the application to generate a screen or overlay providing a calendar with information centered around the item's date and provide a set of search suggestions to expand or restrict the indicated date range.

As another example, a tap on the hotspot centered on recipient address or distribution list in an item can cause the application to generate a screen or overlay providing a directory of other recipients and groups in the organization. These recipients and/or groups may then be easily added or removed from the search criteria. A further tap refines the search and presents the newly refined search result as a list.

Next, further detail is provided on an application's interaction with conventional search options of an Advanced Search Display. At any time during the gesture-based interaction the user may switch to a conventional search options display where they are able to select search filters using conventional menus and choice dialogs. Typically this display is selected by tapping on the "Ellipsis" icon in the upper right of most displays.

FIG. 13 shows layout 1300 of a conventional search options display, with its Search Filter Options menu. This facility is useful when none of the gesture-based suggestions presented previously provide a set of desired filter refinements for the user. The user may then select from the menu presented and refine each of the filters directly. Notably:

1. Cancel button icon 1302 provides an interface to activate a command to dismiss changes of the filters so far;
2. Reset button icon 1304 provides an interface to reset all filters to their "unset" or default values;
3. Search Filter Advanced Options menu 1306 provides a list of filter options with a summary of their current settings. Tapping an option creates a subsequent menu where the current setting can be edited; and
4. Execute Search Button icon 1308 provides an interface to cause the application to perform the search with the current settings of the filters. The result would be generated in a next screen resembling those described for FIG. 6 or 11.

Figure 14:
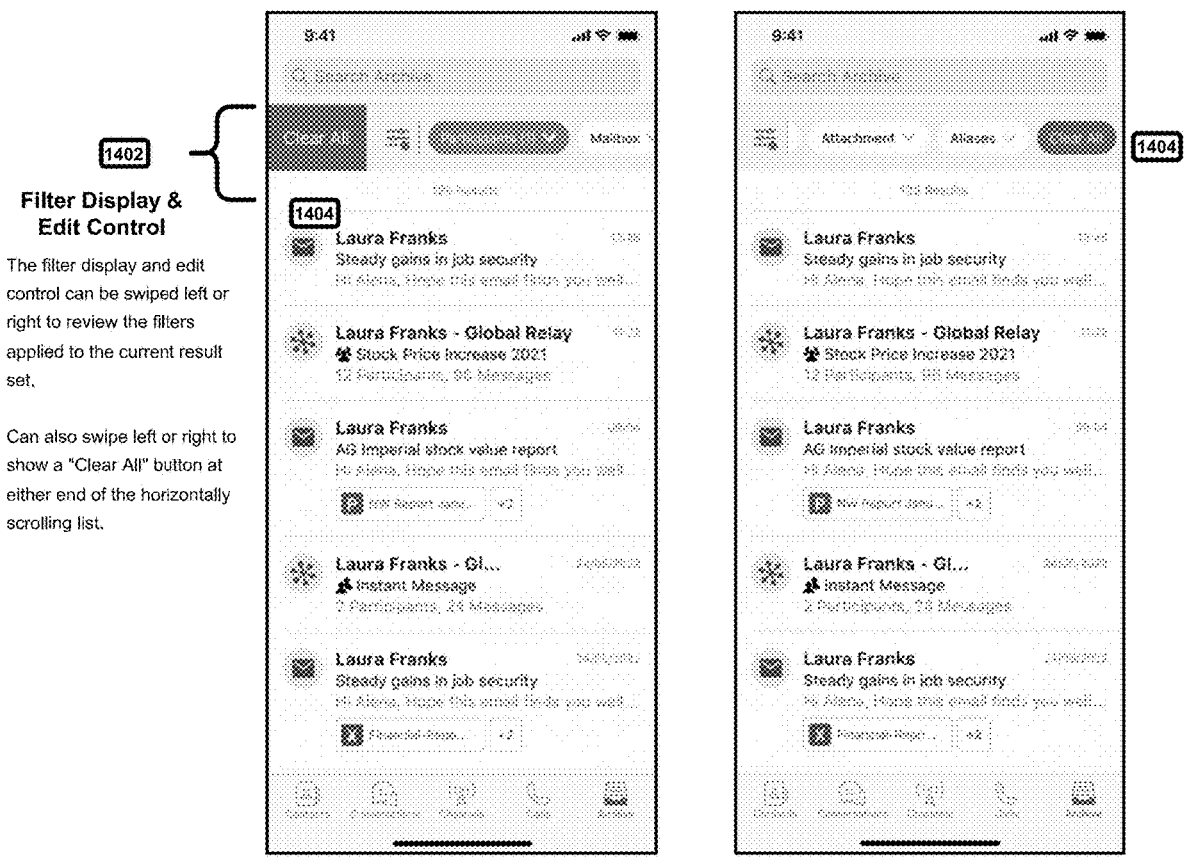
FIG. 14 is a schematic diagram of a progression of filtered search view screens generated on a remote device accessing the search engine for an embodiment of FIG. 1.

Next, further detail is provided on processes executed by the application when a filter is cleared. FIG. 14 shows a series of screens illustrating mechanisms for clearing existing filters. The Filter Display and Edit icon 1402 operates as a "ribbon" or horizontally scrollable region. Typically there are too many filters for all items to be displayed, so the ribbon enables scrolling the region to display the hidden filters using the swipe left and swipe right gestures.

Providing an extreme "Swipe Left" or "Swipe Right" gesture on the Filter Display and Edit control causes the application to generate a "Clear-all" button 1404 positioned at the ends of the control. Tapping one of these buttons clears all filters and reverts the application to a display as described relating to FIG. 6.

Next, examples are described for an application processing a first selected item as a group SMS message. Referring to FIG. 15, the application can render different datatypes in different formats according to the metadata stored in the backend data store and retrieved using the search engine.

Labeled regions of screen 1500 include:
Item datatype label icon 1502;
"Back" button icon 1504;
"Ellipsis" icon 1506, providing Additional Search options;
Item Header Display icon 1508, including datatype icon, sender, date, subject, participants, and Additional Header Display options icon;
"Down arrow" icon 1510, providing Additional Header Display options; and Item Body Display icon 1512, providing rendering of the item showing a sequence of instant messages among the participants in the chat in a chronological order with sender and timestamps.

FIG. 16 shows a related display to screen 1500 except that screen 1600 displays Advanced Search Display with hotspots when for a Group SMS Message datatype. The application generates clickable data fields as hotspots or URLs according to the metadata stored in the backend data store and retrieved using the search engine. Labeled regions of screen 1600 include:

Item datatype icon 1602;
"Back" button icon 1604;
"Ellipsis" icon 1606, providing additional search options;
Item Header Display icon 1608, including datatype icon, sender, date, subject, participants, and Additional Header Display options icon;
"Down arrow" icon 1610, providing additional header display options;
Item Body Display field 1612, providing a rendering of the item showing sequence of instant messages among participants in the chat in chronological order with sender and timestamps; and
Legend icon 1614, identifying borders of clickable data fields in Item Header and Item Body displays. For an embodiment the borders of clickable fields may or may not be visible, may or may not be selectable as a user preference option.

Clickable hotspots or URLs in the Item Header or Item Body may be distinguished from regular text using different borders, colors, fonts, intensity, or shading.

As a summary of processes and features described above in FIGS. 5 to 16, Tables 4 and 5 below provide additional context and summaries of how a series of gesture-based commands are processed by an embodiment. Table 4 provides a cross reference of the displayed items (from searches) to the related Figs, with a brief description.

TABLE 4

| Display Variation Name | Shown in FIG. | Description |
| --- | --- | --- |
| Standard Results List (default, or after search filters are updated) | FIGS. 6, 11, 14 | Display list of items from a search |
| Full Item Display | FIGS. 7, 15, 16 | Display one item with details incl. datatype, selected headers, body content, navigation buttons |
| Popup Search Suggestions | FIG. 8 | Display simple list of search suggestions: From, To, From or To |
| Swipe Left Menu Actions | FIG. 9 | In-item menu: More, From Sender, To Sender |
| Item Preview plus Search Suggestions List | FIG. 10 | Preview of item with multiple search suggestions |
| Advanced Search Item | FIG. 12 | Similar to Full Item Display but with clickable hotspots linked to further search controls |
| Detailed Search Options | FIG. 13 | From the three-dot menu anywhere it is available, showing search filter advanced options |

Table 5 provides a list of exemplary command scenarios (col. 1), showing sequence (Sq) number, a user's search results goal at client 114, against a related datatype with its exemplary target selection for the search results, a series of gestures actions imparted on client 114 through the client GUI, and notes and actions related the sequence executed by an embodiment from the gestures and (seeded) search results. It will be seen that for a given sequence, a (three-dimensional) matrix is presented having an action axis providing for an action, a two dimensional matrix of gestures mapped against actions, possible next actions, and possible seeded search results with subsequent planes, and then for next sequential action(s), additional two dimensional matrices of subsequent gestures mapped against subsequent actions, possible next actions, and possible seeded search results. The gestures provide a natural interface for the user to input actions to progress through the matrix. The seeded search results (which may have been generated by accessing a target element's metadata), also assist in providing related results for the next action and related acceptable gestures for that next action.

TABLE 5

Gesture sequences

| Sq # | User's Goal | Datatype/ Target Selection (example) | Gestures actions | Notes and actions |
| --- | --- | --- | --- | --- |
| 1 | Find email from a sender | Datatype: email vsinclair@compA.com | 1. Home page 2. Swipe up/down (FIG. 6) to scroll through results list to find any message where target alias is sender | The selected message becomes a seed item for further analysis and field extractions. The address of sender (e.g. vsinclair@compA.com) and addresses of all recipients are analyzed to |

TABLE 5-continued

Gesture sequences

| Sq # | User's Goal | Datatype/ Target Selection (example) | Gestures actions | Notes and actions |
|---|---|---|---|---|
| | | | 3. Swipe left (FIG. 9) on first selected message<br>4. Tap button labeled "From" (FIG. 9) | determine their identities and all other aliases.<br>The "From" button tap indicates filters that should be refined to specify "datatype = email". Using the sender's account (shown in Table 2 for the account of Vicky Sinclair) the two email-type aliases corresponding to those aliases and datatype (vsinclair@compA.com and v.sinclair@compA.net) are identified and specified for search.<br>The search is executed with these criteria and results are displayed as shown as per FIG. 11. |
| 2 | Find email sent to a recipient | Datatype: email vsinclair@compA.com | 1. Home page<br>2. Swipe up/down (FIG. 6) to scroll through results list to find any message where target alias is a recipient<br>3. Swipe left on first selected message (FIG. 9)<br>4. Tap button labeled "To" gesture (FIG. 9) | The selected message becomes a seed item for further analysis and field extractions.<br>The addresses of recipients which include (e.g. vsinclair@compA.com) are analyzed to determine their identities and all other aliases.<br>The "To" button tap indicates filters that should be refined to specify "datatype = email"<br>Using the recipients (shown in Table 2 for the account of Vicky Sinclair) the two email-type aliases corresponding to those aliases and datatype (vsinclair@compA.com and v.sinclair@compA.net) are identified and specified for search with all other recipients' aliases.<br>The search is executed with those criteria and result items are displayed as shown in FIG. 11.<br>The second search results may be broad as they may include email items sent from any of the recipients of the first selected message. However they will be a narrower list than the starting list, which did not have any filters specified.<br>The scenario may be repeated or another one executed using a first selected message with a smaller collection of recipients or a message sent exclusively to one of the aliases of Vicky Sinclair to further refine filtering criteria. |
| 3 | Find emails sent to or from an entity as a sender or recipient | Datatype: email vsinclair@compA.com | Actions 1-3 are similar to those in Sqs #1 and 2, except target alias may be observed as either a sender or recipient.<br>In action 4, tap button labeled "To or From" (FIG. 9) | This is similar to scenarios 1 and 2 except the second search results may be broad as they include emails sent to or received from any of the recipients or the sender of the first selected message.<br>However the messages returned may include a complete conversation history involving Vicky Sinclair and other recipients in both to and from directions.<br>This scenario may then be repeated or another scenario may be executed to further refine filtering criteria. |
| 4 | Find emails pertaining to a thread or subject | Datatype: email Subject: "Investment environment changes" | 1. Home page<br>2. Swipe up/down to scroll through results list to find any message in the message thread, e.g. "Investment environment changes" (FIG. 6)<br>3. Tap desired item to activate "full item display" (FIG. 6) resulting in FIG. 7<br>4. Tap up arrow to activate "Search Suggestions" gesture (FIG. 7) and generate a popup display similar to FIG. 10<br>5. Tap "Search: Thread (6)" in screen 1002 (FIG. 10) to filter by this thread containing the listed messages (here 6 messages) | Item preview display can be activated multiple ways, for example from a Full item display (FIG. 7) or by a gesture, such as a long press on the item (FIG. 6). From the item preview, additional search suggestions are generated and displayed, which may include an option to search by the message thread of currently-previewed item (1002).<br>The item being previewed becomes a seed item for a search containing the same thread identifier header (if present) or the same subject string (if thread identifier header is absent). |
| 5 | Find emails from a company | Datatype: email Organization: Company D | 1. Home page<br>2. Swipe up/down (FIG. 6) to scroll through results list to find any message from someone at the desired organization, e.g. agimperials "compD.com"<br>3. Long press desired item (FIG. 6) to activate "preview item display" resulting in screen per FIG. 10<br>4. Tap button (FIG. 10) "From: agimperials.com" (aka Company D) in | The first selected message becomes a seed item for further analysis and field extractions.<br>The domain portion of the address of sender (e.g. alena.baptista@compD.com) is extracted to identify an organization's domain.<br>The domain searched (with its aliases) to determine its identity and other domains associated with the organization.<br>The "From: agimperials.com" (aka comp D) button indicates the filters should be refined to specify datatype = email and then any of the sender |

TABLE 5-continued

Gesture sequences

| Sq # | User's Goal | Datatype/ Target Selection (example) | Gestures actions | Notes and actions |
|---|---|---|---|---|
| | | | screen 1002 to filter items from this organization | organization's domains for search. The search is executed with these criteria and result items are displayed as shown in FIG. 11. Searching by organization may identify additional senders within that organization even if they are not shown in the first search results, thereby providing broader results. |
| 6 | Find emails sent to a company | Datatype: email Organization: Company D (@compD.com) | 1. Home page 2. Swipe up/down (FIG. 6) to scroll through results list to find any message to someone at desired organization, e.g. "compD.com" 3. Long press (FIG. 6) desired item to activate "preview item display" resulting screen shown in FIG. 10 4. Tap (FIG. 10) button "To: agimperials.com" (aka Company D) in screen 1002 to filter items to this organization | Similar processing as scenario #5 except for reversing roles of sender and recipient. The recipient(s) list is analyzed to find a seed for domains of address(es) and a search is conducted of corresponding organization(s), including alias domains. Searching by an organization may identify additional recipients of messages to an organization even if they are in the first search result, thereby providing broader results. |
| 7 | Find emails sent to or from a company | Datatype: email Organization: Company D (@compD.com) | Actions are similar to Sqs. #5 and 6, except the target organization's domain may be observed as either a sender or recipient. In Action 4, tap button gesture (FIG. 10) "Includes: agimperials.com" (1002) | Similar processing as scenario #5 and #6 except using an organization's domains as either sender or recipient. |
| 8 | Find all messages (Group SMS) from a sender | Datatype: any +448883885990 | 1. Home page 2. Swipe up/down (FIG. 6) to scroll through results list to find any message where target alias is sender 3. Swipe left (FIG. 9) on first selected message 4. Tap button "From" (FIG. 9) | When the first selected message is not datatype email the search may be expanded to include emails and special datatypes, as listed in Table 2. For example, FIG. 15 shows special datatype "Group SMS" which represents a transcript of a collection of SMS text messages among a group of participants. By having tables of aliases per Table 2 containing phone numbers of participants, an alias lookup search may determine identities of participants and their aliases for the target datatype and other datatypes. |
| 9 | Find all messages (Group SMS) sent to recipient | Datatype: any Amal Fitzpatrick (+445845520648) | Continuing from Sq #8: 1a. Tap participant list (FIG. 15, 1510) in header display of item to reveal participants 1b. Tap specific participant (not shown) OR 2. Left swipe specific message of participant (FIG. 15, 1512) in content display to show menu of buttons (as per FIG. 9) 3. Tap menu "To Sender" (FIG. 9) | For special datatypes (such as Group SMS and other message transcripts) additional metadata is tracked with the message. The use of the special datatypes/metadata enables customizing of information displayed as shown in FIG. 15. For example, individual senders of instant messages may be identified by first name, last name, phone number, date and time of message. When this sequence of gestures is executed, the search criteria are refined to search items of all datatypes that are from the selected sender Amal Fitzpatrick (here associated with phone number +445845520648). |
| 10 | Find all messages sent to or from an entity as a sender or recipient | Datatype: any +448883885990 | Similar to Sq #8: 1. Home page 2. Swipe up/down (FIG. 6) to scroll through results list to find any message where target alias is sender 3. Swipe left on first selected message (FIG. 9) 4. Tap button "More" gesture (FIG. 9) screen of FIG. 8 is created showing: popup of additional search suggestions. 5. Tap button "Search From or To" (FIG. 8) | As with Sq #8, if a search (with its previous gesture) does not reveal a desired search option, another input gesture may be provided initiate another search with an expanded list. In this example, the user wanted to find all messages of any datatype where the first selected message was a Group SMS from the phone number indicated here. Using a sequence of actions "swipe up/down", "swipe left", tap "more", and then tap "Search From/To", it is determined that from this sequence, a focus of the searches was to locate all messages related to an account which contains the phone number, as the phone number was revealed an alias associate with the sender. |

As a further summary of processes and features described above in FIGS. 5 to 16, FIG. 17 shows a flowchart 1700 representing a gesture decision tree algorithm executed by search engine 206b, gesture analysis module 206c and other modules within process 206a. As shown, at 1702, search engine 206b is started, typically in response to a search request initiated by a user at device 108. As one initiation function before gestures are expected, filters are cleared at process 1704, which resets all search filters to their default values.

As another initiation function, at process 1706, the archive is queried and returned items are displayed on device 108. Typically, the results are sorted and displayed in a selected sort order.

As a final initiation function, at process 1708, device 108 prompts the user to select an item from the list of returned items, then waits for a gesture to be provided by the user to device 108. The gesture for selection of the item and the specific gesture on the item (here: tap, long press, swipe left, or swipe right) may be imparted by the user on device 108 as one fluid motion; however gesture analysis module 206c may analyze and interpret the motion as a sequence of independent inputs, resulting in analysis functions being executed for one or more independent inputs and corresponding updates being made to the display.

For an embodiment, gesture analysis module 206c processes gestures indicated by user of device 108 on its screen. Depending on whether and what gesture is detected, the decision tree algorithm will execute different commands for different gestures.

If a "Swipe Left" gesture is detected, then process 1710a proceeds to process 1712 to generate a Swipe Menu as an overlay to generate a list of menu buttons. FIG. 9 and the related disclosure provide further aspects of generating and processing gestures in the Swipe Menu.

Again, gesture analysis module 206c waits for additional gestures received at device 108. For the Swipe Menu overlay, the next expected/accepted gestures are to activate one of the three buttons.

If the detected gesture is an activation of the second or third button (at process 1714a), then the algorithm proceeds to process 1716, which applies that button's filter criteria to the current session and refines the displayed results.

Next, at process 1718, these filtered criteria are merged with the existing filters and the algorithm loops back to process 1706, above, querying the archive with those criteria and displaying the results.

However, from process 1714, if the detected gesture was activation of the first/more Button (shown at process 1714b), the algorithm proceeds to process 1720, which generates an overlay of the Item Preview. FIG. 10 and the related disclosure provide additional features of the Item Preview process.

Again, gesture analysis module 206c waits for additional gestures received at device 108. For the Preview overlay, the next expected/accepted gestures are to tap to activate one of the variable number of displayed Search Suggestion Buttons. The number (N) of Search Suggestion Buttons and the corresponding search refinement action for each are dynamically determined from results of process 1708.

At process 1722b, if the detected gesture is that the user taps one of the available Search Suggestion Buttons, the application then applies the button's filter criteria to the current session. Again, per process the change to the filter criteria are applied and merged with the existing filters per process 1724. FIG. 10 and the related disclosure provide additional aspects of the processing of search selection buttons. Screen 1004 illustrates that a tap on the Search Suggestion 4 is mapped to activation of search filters to search for all email messages from the organization of "agimperials.com" (with results provided in screen 1006) since previous analysis of the item in the preview display was of datatype "Email" and contained the header "From: a.baptista@compD.com". A single tap on a search suggestion button causes the search results to be refined according to that button's dynamically generated label.

At process 1718, the messaging application refines the filter display shown on the display and then returns to process 1706, which initiates a further query to the database with the new criteria and then displays the new results.

Alternatively, leaving from process 1722a, if the user applies the gesture "Tap" to the Item Preview, then per process 1722b, the application displays Advanced Search Controls per process 1726. FIG. 12 and the related disclosure provide additional aspects of the operation of Advanced Search.

Alternatively, continuing from the First Selected Item (process 1710a) at process 1710b, if a "Item Tap" gesture is detected, then the algorithm proceeds to process 1734 to the First Selected Item the application to changes the display to the Item Full Screen Display. FIG. 7 and the related disclosure provide additional aspects of the operation of the Full Screen Item Display.

If a "Swipe Left" or "Swipe Right" gesture is detected, then at process 1736, the algorithm transits to the previous or next Archive Item at process 1738 and then process 1734 displays the newly selected First Selected Item.

Alternatively, continuing from process 1708, 1710a and 1710b, if the back button gesture is detected at process 1708c, the user has provided a tap the "Back" button. The algorithm returns to process 1704 to clear all filters per process 1704 and sets them to the default or initial state. Process 1708 includes selecting data items, analyzing metadata and looking up aliases, following earlier features described for process 408 (FIG. 4).

It will be appreciated that the above commands and gesture sequences illustrate one (three dimensional) matrix of gestures mapped to sequential commands and seeded search results. Variation may use different forms of gestures, different sequences of gestures, and/or different seeded search results to implement a natural flow of gesture-based commands for searching datasets.

While the disclosure herein provides details on a search engine fora messaging system utilizing gestures, it will be appreciated that the concepts and features of the gesture-based navigation system may be applied in other applications where searches are conducted on a dataset, such as general database systems, data archiving systems, message archiving systems, accounting systems, online sales systems, online transaction systems (e.g. for booking hotels, purchasing tickets, scheduling appointments, etc.).

The various features described above may be implemented in, and fully automated by processes executed by general-purpose computing devices, including but not limited to data center servers, PCs, tablets, laptops and mobile phones. The processes may be stored in any type or types of computer storage device or memory. It should be understood that the various steps may alternatively be implemented in-whole or in-part within specially designed hardware.

It will be appreciated that all processes, servers, managers, agents, and modules described herein for platform 104, database 106, process 206a, client 114 on devices 108 and other sessions, processes, steps or functions in embodiments may be implemented using known programming techniques, languages and algorithms, such as Java, C++, and others. Although the processes, services and modules described are implemented in client 114 on devices 108 and in platform 104, it will be appreciated that some functions of the processes may be provided in a separate server that is in communication with devices 108 and/or platform 104. The titles of processes and platforms are provided as a convenience to provide labels and assign functions to certain processes. It is not required that a process perform only its functions as described above. As such, specific functionalities for each application or process may be moved between processes or separated into different processes. Processes may be contained within other processes. Different signaling techniques may be used to communicate information between applications using known programming techniques. Known data storage, access and update algorithms allow data to be shared between applications. It will further be appreciated that other applications and systems on platform 104 and device 108 may be executing concurrently with other processes. As such, any of modules (or parts thereof) may be structured to operate in or as a "background" application on device 108 and platform 104, respectively, using programming techniques known in the art.

It will be appreciated that the embodiments relating to clients, servers, processes, services, state machines, and systems may be implemented in a combination of electronic hardware, firmware, and software. The processes, firmware, and software may be implemented as a series of processes, applications, and/or modules that provide functionalities described herein. The algorithms and processes described herein may be executed in different order(s). Interrupt routines may be used. Data may be stored in volatile and non-volatile devices described herein and may be updated by the hardware, firmware, and/or software.

As used herein, the wording "and/or" is intended to represent an inclusive-or. That is, "X and/or Y" is intended to mean X or Y or both.

In this disclosure, where a threshold or measured value is provided as an approximate value (for example, when the threshold is qualified with the word "about"), a range of values will be understood to be valid for that value. For example, for a threshold stated as an approximate value, a range of about 25% larger and 25% smaller than the stated value may be used. Thresholds, values, measurements and dimensions of features are illustrative of embodiments and are not limiting unless noted. Further, as an example, a "sufficient" match with a given threshold may be a value that is within the provided threshold, having regard to the approximate value applicable to the threshold and the understood range of values (over and under) that may be applied for that threshold.

Although this disclosure has been described in terms of certain embodiments and applications, other embodiments and applications that are apparent to those of ordinary skill in the art, including embodiments which do not provide all of the features and advantages set forth herein, are also within the scope of this disclosure. Accordingly, the scope of the present disclosure is intended to be defined only by reference to the following claims.

The invention claimed is:

1. A computer-implemented method implemented in a server and a client communicating with the server for generating and utilizing transformed contact information related to an electronic message in response to search commands provided in graphical user interface (GUI) operating on the client, the method comprising:
maintaining a database having sets of records linked by metadata relating to
message senders with one or more recipients; and
a plurality of identifiers for each of the senders;
upon receiving a message received at the client, executing a first set of instructions on a first processor at the client that accesses the database that:
determines a first set of commands that are associated with a first set of gestures for the message extracted from the database being reviewed at the client;
receives a gesture imparted on a touchscreen at the client;
compares the gesture against the first set of gestures; and
if the gesture matches one gesture of the first set of gestures, sends a command mapped to the gesture to the server;
then executing a second set of instructions on a second processor at the server that:
receives the command;
extracts an identifier from a record of the set of records relating to the message;
identifies a new identifier for the message based on the message sender;
transforms metadata associated with the message to include the new identifier;
executes a query to the database related to the command and the new identifier;
retrieves results from the query from the database by accessing additional metadata associated with the record, the results comprising a second record having data and additional metadata; and
sends the results to the client;
and
then executing a third set of instructions on the first processor that:
receives the results;
displays a list of the results; and
determines a second set of commands that are associated with a second set of gestures based on the new identifier, the additional metadata and the results,
wherein
the database contains the plurality of identifiers and a plurality of datatypes, metadata, and aliases comprising emails, text messages, and telephone calls; and
the plurality of identifiers indicates participants in the message.

2. The method as claimed in claim 1, wherein the third set of instructions further comprises instructions to:
display on the touchscreen a graphical hotspot for search results designated to accept additional gestures, the hotspot graphically marked by a change in one or more of visual aspects for presentation of the record in the hotspot.

3. The method as claimed in claim 2, wherein in the hotspot:
an appearance of text is distinctive from the appearance of text for the message.

4. The method as claimed in claim 3, wherein:
the message is an email; and
in the hotspot the additional gestures are associated with identifying additional records based on either a sender or a recipient in the record.

5. The method as claimed in claim 1, wherein:
the client is executing a search application;
the record is an email; and
the server operates a search engine relating to emails.

6. The method as claimed in claim 1, wherein:
each participant has a set of aliases identifying its datatypes; and
if participants are identified, the command utilizes additional metadata associated with the message to identify the second record.

7. The method as claimed in claim 6, wherein:
the identifier is a group identifier;
the records contain system wide mapping tables relating to the identifier;

the third set of instructions determines the second set of commands by creating an organized set of command suggestions presented as options to refine the command, from an analysis of data comprising data relating to a user of the client and an analysis of the identifier to list group or domain members associated with the command.

8. The method as claimed in claim 7, wherein:
the first gesture is a swipe left gesture; and
the second gesture is a long swipe left gesture.

9. The method as claimed in claim 8, wherein the method further executes a fourth set of instructions on the second processor that:
receives the second command;
identifies a second identifier for the second record;
queries metadata associated with the second identifier to identify aliases for the second identifier;
executes a second query to the database related to the second command, the second identifier, and the aliases;
retrieves second results from the second query; and
sends the second results to the client device.

10. The method as claimed in claim 1, wherein:
the results are listed in a ranked list generated from a statistical analysis of the results.

11. The method as claimed in claim 1, wherein:
a command "more records" is associated with a "swipe left" gesture in the first and second sets of commands.

12. An electronic device in communication as a client device with a server having a database of records and generating transformed information relating to messages received at the electronic device, the electronic device comprising:
a first processor;
a touchscreen; and
a memory device, the memory device storing a first application operating on the electronic device, the first application comprising instructions for execution on the first processor that:
upon receiving an electronic message at the electronic device determine a first set of commands that are associated with a first set of gestures for a record associated with the message extracted from the database being reviewed at the electronic device;
receive a gesture imparted on the touchscreen;
compare the gesture against the first set of gestures;
if the gesture matches one gesture of the first set of gestures, create a command mapped to the gesture and send the command to the server for application to the database; and
after receiving from the server results of the command comprising a second record having data and metadata:
receive the results;
display a list of the results; and
determine a second set of commands that are associated with a second set of gestures based on the results,
wherein
the database comprises sets of records linked by metadata relating to
message senders with one or more recipients; and
a plurality of identifiers for each of the senders; and the server comprises:
a second processor; and
a second memory device storing a second software application operating on the server, the second application comprising instructions for execution on the second processor that:
extract an identifier of the plurality of identifiers from a record of the set of records relating to the message;
identify a new identifier for the message based on the message sender;
transform metadata associated with the message to include the new identifier;
determine a first set of commands that are associated with a first set of gestures for the message extracted from the database being reviewed at the client;
receive the command from the electronic device;
query metadata associated with the identifier;
execute a query to the database related to the command and the new identifier;
retrieve results from the query from the database by accessing additional metadata associated with the record, the results comprising a second record having data and additional metadata; and
send the results to the electronic device.

13. The electronic device as claimed in claim 12, wherein the first application further comprises instructions that:
displays on the touchscreen a graphical hotspot for search results designated to accept additional gestures, the hotspot graphically marked by a change in one or more of visual aspects for presentation of the record in the hotspot,
wherein an appearance of text is distinctive from the appearance of text for the record.

14. The electronic device as claimed in claim 13, wherein:
the record is an email; and
in the hotspot the additional gestures are associated with identifying additional records based on either a sender or a recipient in the record.

15. The electronic device as claimed in claim 14, wherein:
the records have a plurality of datatypes comprising emails, text messages, and telephone calls and a plurality of identifiers indicating participants in the records;
each participant has a set of aliases identifying its datatypes; and
if participants are identified, the command utilizes additional metadata associated with the record to identify the second record.

16. The electronic device as claimed in claim 14, wherein:
a command "more records" is associated with a "swipe left" gesture in the first and second sets of commands.

17. The electronic device as claimed in claim 13, wherein:
the identifier is a group identifier;
the records contain system wide mapping tables relating to the identifier; and
the third set of instructions determines the second set of commands by creating an organized a set of command suggestions presented as options to refine the command, from an analysis of data comprising data relating to a user of the client and an analysis of the identifier to list group or domain members associated with the command.

18. A computer-implemented method implemented in a server and a client communicating with the server for generating transformed information relating to electronic messages received at the client and processing search commands for a database of records for use in graphical user interface (GUI) operating on the client, the method comprising:
- maintaining a database having sets of records linked by metadata relating to
  - message senders with one or more recipients; and
  - a plurality of identifiers for each of the senders;
- upon receiving a message received at the client, executing a first set of instructions on a first processor at the client that accesses the database that:
  - determines a first set of commands that are associated with a first set of gestures for a record extracted from the database being reviewed at the client;
  - receives a swipe left gesture imparted on a touchscreen at the client;
  - compares the swipe left gesture against the first set of gestures; and
  - if the swipe left gesture matches one gesture of the first set of gestures, sends a command mapped to the gesture to the server to be initiated to the database;
- then executing a second set of instructions at a second processor at the server that:
  - receives the command;
  - extracts an identifier relating to the message;
  - identifies a new identifier for the message based on the message sender and metadata associated with the identifier;
  - executes a query to the database related to the command and the new identifier;
  - retrieves results from the query from the database by accessing additional metadata associated with the record, the results comprising a second record having data and additional metadata; and
  - sends the results to the client;
- then executing a third set of instructions on the first processor that:
  - receives the results;
  - displays a list of the results; and
  - determines a second set of commands that are associated with a second set of gestures based on the additional metadata and the results;
- then executing fourth set of instructions on the first processor:
  - determines a second set of commands that are associated with a second set of gestures for a record extracted from the database being reviewed at the client device;
  - receives a long swipe left gesture imparted on the touchscreen at the client device; and
  - if the long swipe left gesture matches one gesture of the second set of gestures, sends a second command mapped to the long swipe gesture to the server; and
- then executing a fifth set of instructions on the second processor that:
  - receives the second command;
  - identifies a second identifier for the second record;
  - queries metadata associated with the second identifier;
  - executes a second query to the database related to the second command and the second identifier;
  - retrieves second results from the second query; and
  - sends the second results to the client device, wherein
the records have a plurality of datatypes, metadata, and aliases comprising emails, text messages, and telephone calls and a plurality of identifiers indicating participants in the records.

* * * * *